United States Patent
Bosscher et al.

(10) Patent No.: US 9,838,085 B2
(45) Date of Patent: Dec. 5, 2017

(54) STACKABLE, MAGNETICALLY-RETAINED CONNECTOR INTERFACE

(71) Applicant: Apple Inc., Cupertino, CA (US)

(72) Inventors: Nathan P. Bosscher, Campbell, CA (US); Eric S. Jol, San Jose, CA (US); Albert J. Golko, Saratoga, CA (US); Jeffrey J. Terlizzi, San Francisco, CA (US); Jahan C. Minoo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/060,512

(22) Filed: Mar. 3, 2016

(65) Prior Publication Data
US 2016/0211889 A1    Jul. 21, 2016

Related U.S. Application Data

(63) Continuation of application No. 14/500,556, filed on Sep. 29, 2014, now Pat. No. 9,300,083.
(Continued)

(51) Int. Cl.
*H01R 11/30* (2006.01)
*H01R 13/60* (2006.01)
(Continued)

(52) U.S. Cl.
CPC ......... *H04B 5/0037* (2013.01); *H01R 13/514* (2013.01); *H01R 13/6205* (2013.01);
(Continued)

(58) Field of Classification Search
CPC .............. H01R 23/025; H01R 13/6205; H01R 13/5066; H01R 13/506; H01R 13/514; H01R 13/6683; H01R 11/30
(Continued)

(56) References Cited

U.S. PATENT DOCUMENTS 3,521,216 A * 7/1970 Tolegian ............ H01R 13/6205
439/152
3,808,577 A * 4/1974 Mathauser ......... H01R 13/6205
439/180
(Continued)

FOREIGN PATENT DOCUMENTS

CN 1941705 4/2007
CN 202405510 8/2012
(Continued)

OTHER PUBLICATIONS

Extended European Search Report for European application No. 16167290.2 dated Aug. 5, 2016, 8 pages.
(Continued)

*Primary Examiner* — Hae Moon Hyeon
(74) *Attorney, Agent, or Firm* — Kilpatrick Townsed & Stockton LLP

(57) ABSTRACT

A stackable connector interface with magnetic retention for electronic devices and accessories can allow power and data to be transferred between one or more stacked connectors. Each interconnected stackable connector includes one or more magnetic elements, which magnetic elements have poles arranged to facilitate mating with other stackable connectors. The magnetic elements provide a magnetic retention force that holds mated connectors in contact with each other. In some embodiments, the connectors include connection detection circuitry for determining whether the connectors are mated with other connectors, thereby allowing the connectors to prevent live contacts from being exposed at an unmated surface of the connectors. In some embodiments, routing circuitry is included to determine how signals should be transferred between the interconnected stackable connectors and/or corresponding devices.

18 Claims, 17 Drawing Sheets

Related U.S. Application Data

(60) Provisional application No. 61/884,730, filed on Sep. 30, 2013.

(51) Int. Cl.

| | | |
|---|---|---|
| *H04B 5/00* | (2006.01) | |
| *H01R 13/62* | (2006.01) | |
| *H01R 13/66* | (2006.01) | |
| *H01R 43/26* | (2006.01) | |
| *H01R 13/514* | (2006.01) | |
| *H01R 25/00* | (2006.01) | |
| *H02J 50/10* | (2016.01) | |
| *H02J 7/00* | (2006.01) | |
| *H02J 7/02* | (2016.01) | |
| *H02J 50/90* | (2016.01) | |
| *H01R 13/703* | (2006.01) | |
| *H01R 29/00* | (2006.01) | |
| *H01F 38/14* | (2006.01) | |

(52) U.S. Cl.
CPC ....... *H01R 13/665* (2013.01); *H01R 13/6616* (2013.01); *H01R 13/6633* (2013.01); *H01R 13/6683* (2013.01); *H01R 25/006* (2013.01); *H01R 43/26* (2013.01); *H02J 7/0052* (2013.01); *H02J 7/025* (2013.01); *H02J 50/10* (2016.02); *H02J 50/90* (2016.02); *H04B 5/0081* (2013.01); *H01F 2038/143* (2013.01); *H01R 13/7031* (2013.01); *H01R 29/00* (2013.01); *H01R 2201/16* (2013.01); *Y10T 29/49002* (2015.01)

(58) Field of Classification Search
USPC .............................................. 439/38, 39, 40
See application file for complete search history.

(56) References Cited

U.S. PATENT DOCUMENTS

| | | | | |
|---|---|---|---|---|
| 3,810,258 | A * | 5/1974 | Mathauser | H01R 13/6205 439/246 |
| 7,467,948 | B2 * | 12/2008 | Lindberg | H01R 13/6205 439/38 |
| 7,513,038 | B2 * | 4/2009 | Koh | H01R 13/6205 29/825 |
| 7,589,536 | B2 * | 9/2009 | Terlizzi | H04L 27/32 324/527 |
| 7,722,358 | B2 * | 5/2010 | Chatterjee | G06F 3/03543 439/38 |
| 7,775,801 | B2 * | 8/2010 | Shiff | H01R 13/6205 439/39 |
| 8,529,274 | B2 * | 9/2013 | Li | H01R 13/6205 439/38 |
| 8,602,795 | B2 * | 12/2013 | Hsu | H01R 13/6205 439/39 |
| 8,894,419 | B1 * | 11/2014 | Buelow | H01R 13/6205 439/218 |
| 9,088,097 | B2 * | 7/2015 | Kim | H01R 13/6205 |
| 9,225,193 | B2 * | 12/2015 | Yeh | H02J 7/025 |
| 9,300,083 | B2 * | 3/2016 | Bosscher | H01R 13/665 |
| 2012/0206090 | A1 | 8/2012 | Hyun-Jun | H02J 7/025 320/107 |
| 2012/0295451 | A1 * | 11/2012 | Hyun-Jun | H01R 13/6205 439/39 |
| 2013/0040469 | A1 * | 2/2013 | Hsu | H01R 13/6205 439/39 |
| 2013/0157477 | A1 | 6/2013 | McCormack | |
| 2013/0249308 | A1 | 9/2013 | Yeh | |
| 2014/0120746 | A1 * | 5/2014 | Persion | G02B 6/3817 439/39 |

FOREIGN PATENT DOCUMENTS

| | | |
|---|---|---|
| WO | 2004055949 A1 | 7/2004 |
| WO | 2009/116025 A2 | 9/2009 |

OTHER PUBLICATIONS

CN201480053884.5 , "Office Action", dated Apr. 5, 2017, 12 pages.
European Patent Application No. EP14782072.4 , "Office Action", dated Sep. 19, 2017, 6 pages.

* cited by examiner

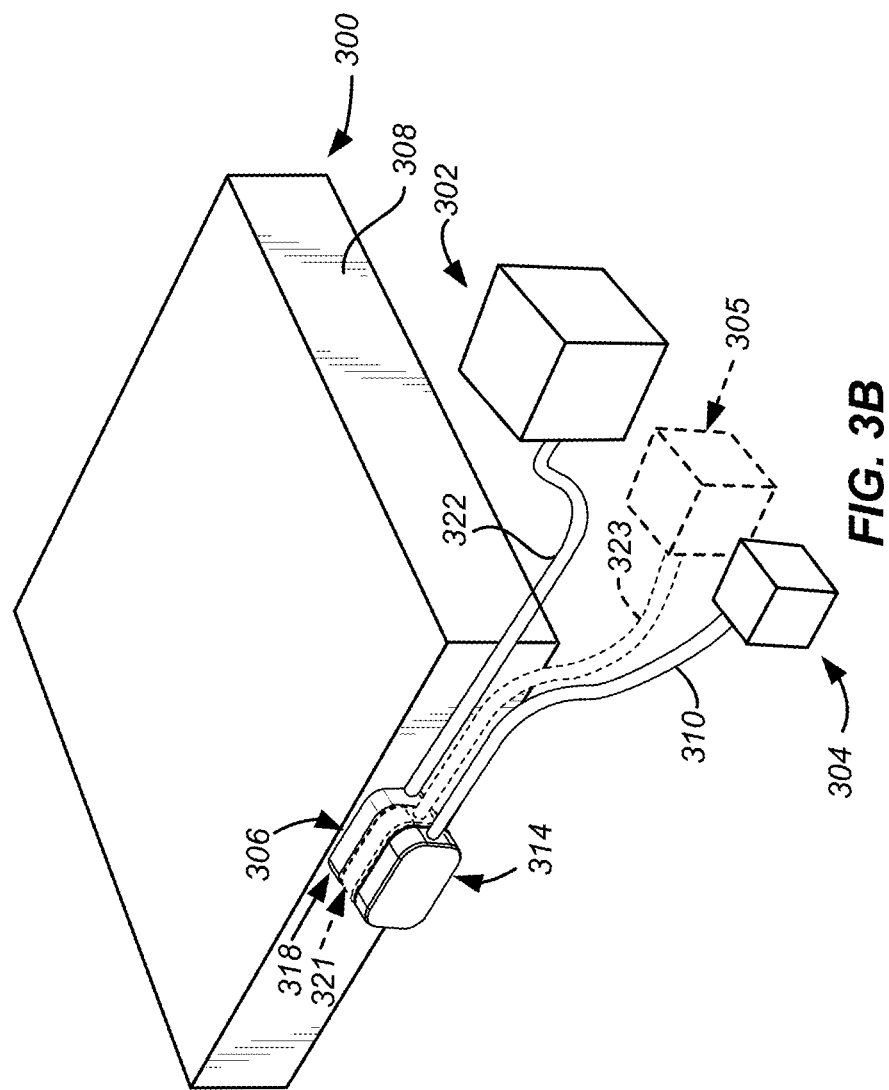

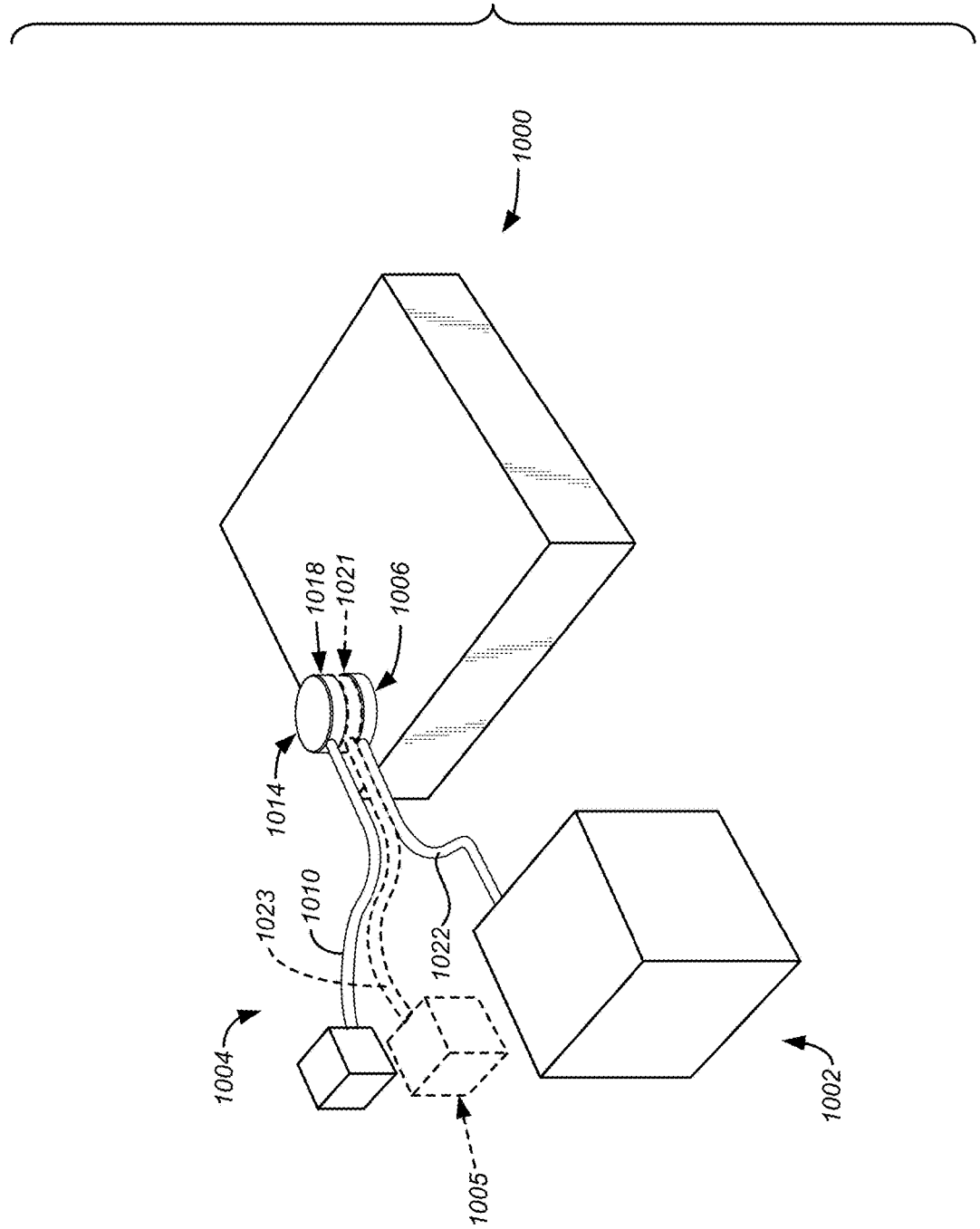

STACKABLE, MAGNETICALLY-RETAINED CONNECTOR INTERFACE

CROSS-REFERENCES TO RELATED APPLICATIONS

The present application is a continuation of U.S. patent application Ser. No. 14/500,556, filed Sep. 29, 2014, which claims priority to U.S. Provisional Application No. 61/884,730, filed Sep. 30, 2013, the disclosure of which is hereby incorporated by reference in its entirety for all purposes.

BACKGROUND OF THE INVENTION

The present invention relates generally to input/output electrical connectors, and in particular connectors for handheld electronic devices.

Many electronic devices include electrical connectors that receive and provide power and data. These electrical connectors are typically receptacle connectors and are designed to receive a single male plug connector extending from a cable, thereby forming one or more conductive paths for signals. The cable may also be attached to a power adapter, accessories, devices or another connector (e.g., a plug or receptacle connector), thereby allowing signals to be exchanged via the cable and the connectors.

As electronic devices continue to become smaller, device enclosures have increasingly limited internal space while still including a large number of internal components, some of which relate to external components. This limited space within the device enclosures creates a number of challenges. For example, the device may only include one or two external connectors and corresponding internal components even though it may be desirable for the device to concurrently receive input and/or provide output via more external connectors.

Wireless signal transfer to electronic devices can address some of the above challenges. However, wired connections may still be required or preferred for the exchanging of signals in certain situations. For example, wired power charging and/or data exchanging may be quicker than their wireless counterparts, and thus preferable for quick charging or exchanging large amounts of data.

Current electronic devices, portable and otherwise, may suffer from some or all of these deficiencies or from similar deficiencies.

BRIEF SUMMARY OF THE INVENTION

Various embodiments of the invention pertain to stackable connectors that improve upon some or all of the above described deficiencies. For example, a stackable connector interface with magnetic retention for electronic devices and accessories may allow power and data to be transferred between one or more stacked connectors and an electronic device. More specifically, this configuration may allow a base device, peripheral devices, other base devices and/or a host power cable to interconnect via this stackable connector interface. The host device may include a receptacle connector, the peripheral and/or other base devices and power cables may include plug and/or receptacle connectors and the host power cable may include a plug connector.

Each interconnected stackable connector may include one or more magnetic elements on one or more sides of the connector body, which magnetic elements may have poles arranged to govern and facilitate mating with magnetic elements of other connectors. For example, the magnetic elements may govern which connectors may be connected using magnetic repulsion to indicate that connectors should not be mated and magnetic attraction to indicate that connectors can be connected. In addition, the magnetic elements may facilitate blind mating as various connectors may only need to be brought proximate each other for magnetic forces to align, orient and bring into contact corresponding connectors. The magnetic elements may also provide a magnetic retention force that holds or retains mated connectors in contact with each other.

The connectors can also include connection detection circuitry for determining whether the connectors are mated with other connectors, thereby allowing the connectors to prevent live contacts from being exposed at unmated connectors. Thus, the connection detection circuitry may prevent contact shorting that may cause harm to users, devices and/or connectors. In addition to connection detection circuitry, routing circuitry may also be included to determine how signals should be transferred between the interconnected stackable connectors.

Thus, embodiments of the present invention may allow one external connector of a device to concurrently connect with multiple connectors of peripheral devices, main devices, power adapters, and others. This may help to conserve limited internal device space as well as external surfaces of portable and even non-portable devices by only requiring or better utilizing one external connector without sacrificing functionality.

According to one embodiment, a stackable connector is provided. The stackable connector can include a body having a first connector, contacts positioned on the first connector, and a first magnet having poles arranged to align and mate the first connector with a corresponding second connector. A cable can extend from the body and include one or more wires. The stackable connector can also include connection detection circuitry configured to determine whether the first connector is mated with the second connector and routing circuitry coupled to the connection detection circuitry and the one or more wires. The routing circuitry can be configured to route signals between the one or more wires and the contacts when the connection detection circuitry detects the first connector is mated with the second connector.

According to another embodiment, a stackable connector is provided. The stackable connector can include a body having first and second connectors, first contacts positioned on the first connector, second contacts positioned on the second connector, a first magnet having poles arranged to align and mate the first connector to a corresponding third connector, and a second magnet having poles arranged to align and mate the second connector to a corresponding fourth connector. The stackable connector can also include a cable extending from the body. The cable can include one or more wires. The stackable connector can also include connection detection circuitry configured to determine whether the first and second connectors are mated with the third and fourth connectors, respectively, and routing circuitry coupled to the connection detection circuitry and the one or more wires of the cable. The routing circuitry can be configured to: (1) route first signals between the one or more wires and the first contacts when the connection detection circuitry detects the first connector is mated with the third connector; (2) route second signals between the one or more wires and the second contacts when the connection detection circuitry detects the second connector is mated with the fourth connector; and (3) route third signals between the first contacts and the second contacts when the connection detection circuitry detects the first connector and second connector are mated with the third connector and the fourth connector, respectively According to yet another embodiment, the invention pertains to a method for forming an electrical connection between stackable connectors. A first plug connector of a first cable assembly can be mated with a first receptacle connector of a second cable assembly. The first plug connector can be coupled to a first cable of the first cable assembly. The first receptacle connector can be coupled to a second cable of the second cable assembly. First signals can be provided to routing circuitry of the second cable assembly by the first cable via the first plug connector. Second signals can be provided to the routing circuitry of the second cable assembly by the second cable. Third signals can be routed to a second plug connector of the second cable assembly using the routing circuitry. The third signals can include one or more signals of the first and second signals. The second plug connector can be mated with a second receptacle of an electronic device. The third signals can be received at the second receptacle via the second plug connector. The third signals can be processed by the electronic device.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIGS. 3A and 3B illustrate unmated and mated stackable connectors, respectively, of a base device, a first peripheral, a second peripheral and a third peripheral, according to an embodiment of the present invention;

FIGS. 10A and 10B illustrate unmated and mated stackable connectors, respectively, of a base device, a first peripheral, a second peripheral and a third peripheral, according to an embodiment of the present invention;

DETAILED DESCRIPTION OF THE INVENTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Embodiments of the present invention provide a stackable, magnetically-retained connector interface for interconnecting multiple main devices, peripheral devices, power sources and other devices and transferring signals (e.g., power and data) therebetween. Magnets may be included to ensure connectors are properly mated with and retain connection with appropriate connectors. The interface may also include circuitry for managing the transferring of signals between stacked connectors. Accordingly, one stackable connector on a device may communicate with multiple connectors and replace the function of and need for multiple traditional connectors on a device.

The detailed description includes two subsections: (I) a traditional wired connector interface and (II) stackable, magnetically-retained connector interfaces according to the present invention. The first subsection provides a description of a traditional wired connector interface that may be improved upon by the present invention. The second subsection provides a description of (A) a two-contact, stackable, magnetically-retained connector interface and (B) a three-contact, stackable, magnetically-retained connector interface.

I. A Traditional Wired Connector Interface

Figure 1A:
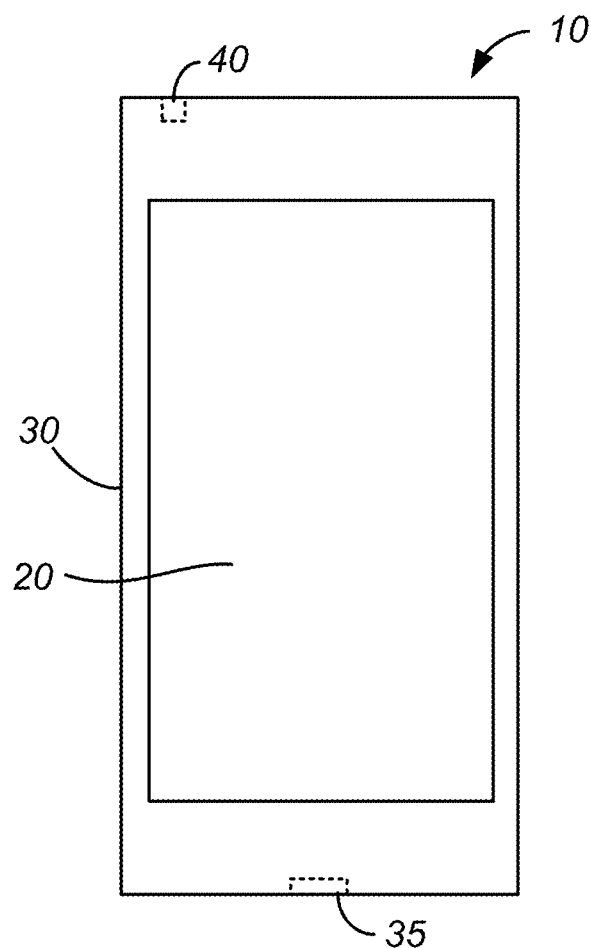
FIG. 1A depicts an illustrative rendering of one particular electronic device.

FIG. 1A depicts an illustrative rendering of one particular electronic device 10. Device 10 includes a touch screen display 20 as both an input and an output component housed within a device housing 30. Device 10 also includes a primary receptacle connector 35 and an audio plug receptacle 40 within device housing 30. Each of the receptacle connectors 35 and 40 can be positioned within housing 30 such that the cavity of the receptacle connector into which a corresponding plug connector is inserted can be located at an exterior surface of the device housing. The cavity can open to an exterior side surface of device 10. For simplicity, various internal components, such as the control circuitry, graphics circuitry, bus, memory, storage device and other components are not shown in FIG. 1A.

Figure 1B:
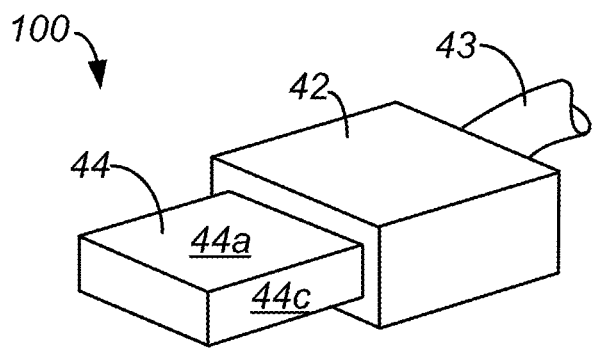
FIG. 1B is a simplified perspective view of a plug connector that can be mated with a corresponding primary receptacle connector of the device of FIG. 1A.

FIG. 1B is a simplified perspective view of plug connector 100 that can be mated with a corresponding primary receptacle connector 35 of device 10 (shown in FIG. 1A). As shown in FIG. 1B, plug connector 100 includes a body 42 and a tab or insertion end 44 that extends longitudinally away from body 42 in a direction parallel to the length of the connector. A cable 43 is attached to body 42 at an end opposite of insertion end 44.

Insertion end 44 is sized to be inserted into corresponding receptacle connector 35 during a mating event and may include contacts (not shown) formed on a first major surface 44a and a second major surface 44b (not shown) opposite surface 44a. Surfaces 44a, 44b extend from a distal tip or end of the insertion end to body 42. When insertion end 44 is inserted into corresponding receptacle connector 35, surfaces 44a, 44b abut a housing of receptacle connector 35 or device 10. Insertion end 44 also includes first and second opposing side surfaces 44c, 44d (not shown) that extend between the first and second major surfaces 44a, 44b. The contacts of connector 100 (not shown) can be used to carry a wide variety of signals including digital signals and analog signals as well as power and ground.

As illustrated and described above with reference to FIGS. 1A and 1B, traditional wired connector interfaces can include numerous complex features on the receptacle connector side to accommodate wired charging, e.g., receptacle connector cavities, accommodations for exposed connector contacts, retention features, complex geometries and materials chosen to protect the connectors against accidental breakage. Devices may even include multiple receptacle connectors such as receptacle connector 35 and audio jack 40 that may require a significant amount of space within and at the exterior of an electronic device, e.g., device 10. However, a stackable, magnetically-retained connector interface may, for example, leverage a single receptacle connector on a device to provide signals to a device that would traditionally require several of the plug/receptacle interfaces shown in FIGS. 1A and 1B. Accordingly, the present invention may, among other things, provide space savings and added functionality as compared to traditional wired interfaces.

II. Stackable, Magnetically-Retained Connector Interfaces

As mentioned above, this subsection provides a description of (A) a two-contact stackable, magnetically-retained connector interface and (B) a three-contact, stackable, magnetically-retained connector interface. The following figures illustrate examples corresponding to the descriptions provided in this subsection.

A. A Two-Contact, Stackable, Magnetically-Retained Connector Interface

Figure 2A:
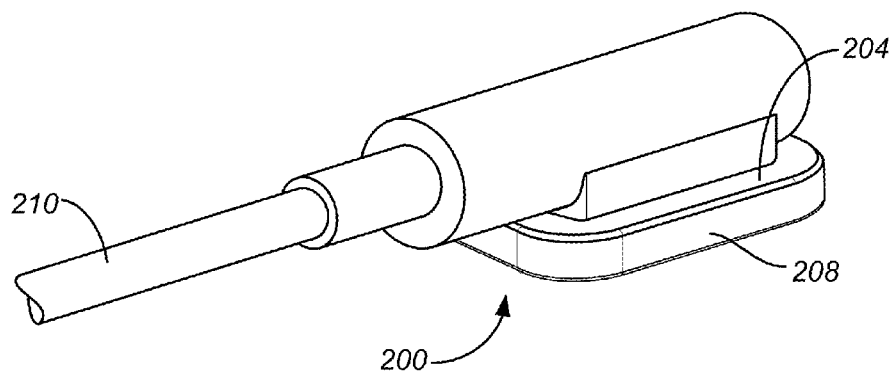
FIGS. 2A and 2B are simplified perspective views of a connector body including a stackable connector that can be mated with a corresponding receptacle connector, according to an embodiment of the present invention.
Figure 2B:
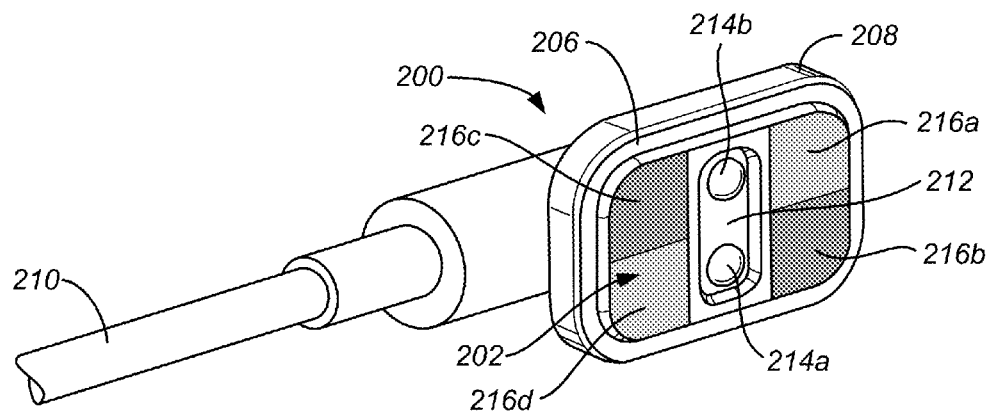
Figure 3A:
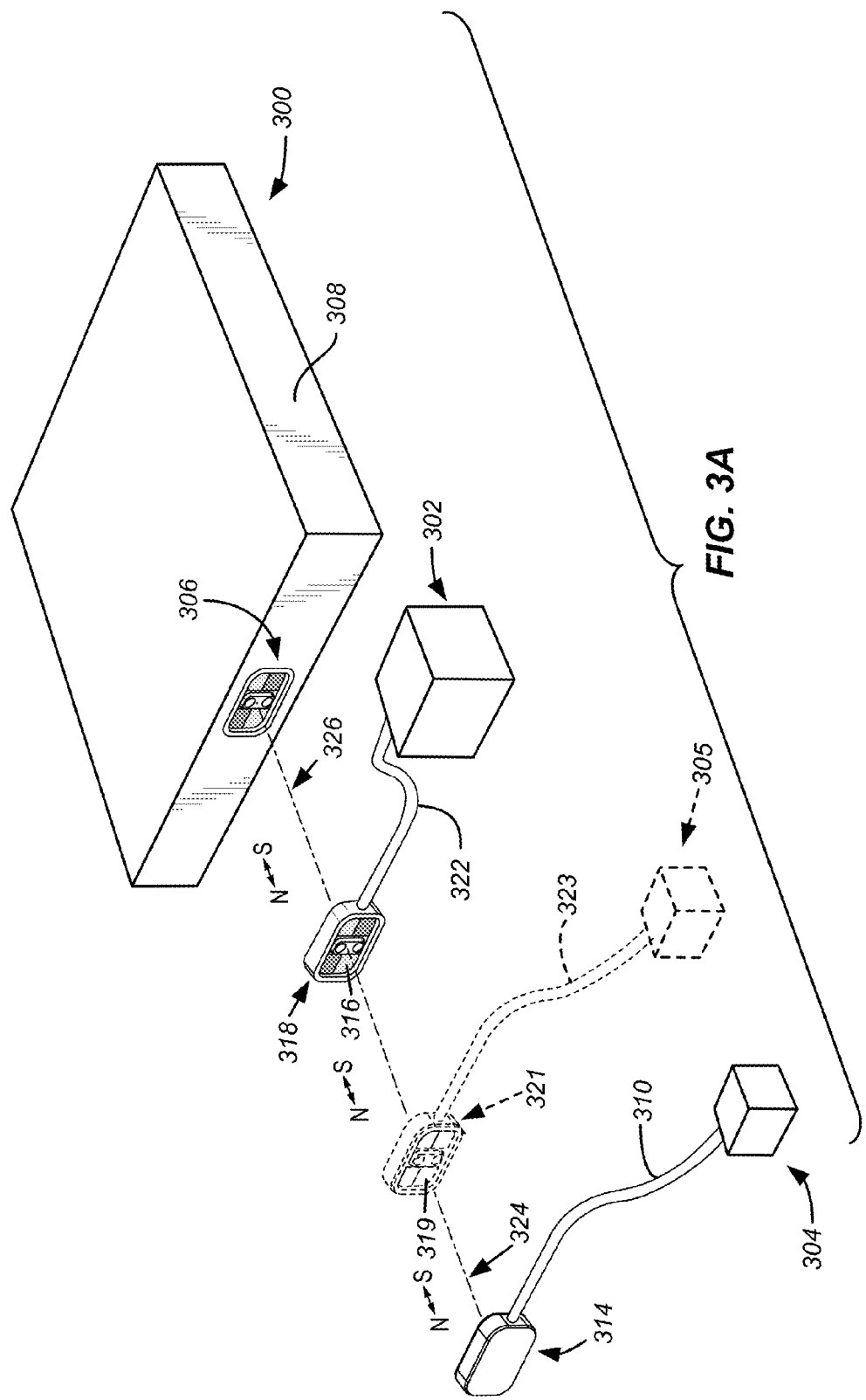

FIGS. 2A and 2B are simplified perspective views of a connector body 200 including a stackable plug connector 202 that can be mated with a corresponding receptacle connector (e.g., connector 316, as shown in FIG. 3A), according to an embodiment of the present invention. As shown in FIGS. 2A and 2B, body 200 looks similar to an Apple MagSafe connector and includes a back surface 204, a front surface 206 and a side surface 208 extending between front and back surfaces 206, 204. A cable 210 extends from side surface 208 and may be coupled with a peripheral (e.g., earphones or a power adapter charger), a device (e.g., device 300, as shown in FIG. 3A), or another connector body (e.g., stackable connector bodies 314, 318 and 321, as shown in FIG. 3A). Cable 210 may include a number of wires coupled to internal components (e.g., routing circuitry, as further described below) of body 200 and accessories, main devices, connectors, and other devices to which cable 210 may also be coupled.

As shown in FIG. 2B, a plug connector 202 may protrude from front surface 206 and include a recessed mating surface 212 for contacting a corresponding mating surface of stackable receptacle connector (e.g., connectors 316 and 319, as shown in FIG. 3A) during mating. Mating surface 212 includes first and second contacts 214a, 214b for transmitting signals (e.g., power and/or data) to corresponding, mated connectors. As shown in FIG. 2B, contacts 214a, 214b are oriented in a plane that is either the same as or parallel to the plane in which mating surface 212 is oriented. Plug connector 202 may be mated with a corresponding connector (e.g., receptacle connector 316, as shown in FIG. 3A) about an insertion axis (e.g., insertion axis 324) that is perpendicular to the plane in which contacts 214a, 214b and/or mating surface 212 are oriented.

Contacts 214a, 214b may be pogo or otherwise deflecting contacts, flat termination surfaces or protruding terminals. FIG. 2B also shows magnets 216a-216d adjacent to mating surface 212. Magnets 216a-216d may have poles arranged to generate a magnetic field that attracts a corresponding receptacle connector and orients, aligns and/or mates plug connector 202 therewith. For example, magnets 216b and 216c may be of the same polarity and have a polarity opposite to that of the polarity of magnets 216a and 216d. To provide this polarity, magnets 216a-216d may be permanent magnets, horseshoe magnets, ferromagnetic materials capable of magnetic attraction, rare-earth magnets, materials capable of substantially maintaining plug connector 202 and a corresponding receptacle connector in a mated position using magnetic forces or any combination thereof. Magnets 216a-216d may not only help to mate connectors but also to retain connectors in a mated position.

As will be further discussed below, signals may be provided at contacts 214a, 214b when connection detection circuitry determines plug connector 202 is mated with a corresponding connector and routed using routing or switching circuitry. The connection detection circuitry may prevent live contacts from being exposed and potentially causing contact shorting that harms users, devices and/or connectors. The routing circuitry may determine how signals should be transferred between the interconnected cables, devices, accessories and other stackable connectors.

Although body 200 is shown and described as including one plug connector (i.e., plug connector 202), embodiments of the invention may also include other types of connectors on body 200. For example, plug connector 202 could be replaced with a receptacle connector or a connector with a flush mating surface indeterminable as a plug or receptacle connector based on physical appearance. Additionally, instead of using magnets to retain mating contact with connector 202, an interference fit may be used to retain connectors in a mated position with connector 202.

As mentioned above, plug connector 202 of connector body 204 may mate with corresponding receptacle connector of devices and cable assemblies; the following figures illustrate examples of these corresponding receptacle connectors and how they mate with stackable plug connectors of the present invention.

FIGS. 3A and 3B illustrate unmated and mated stackable connectors, respectively, of base device 300, a first peripheral 302 (e.g., earphones), a second peripheral 304 (e.g., a power adapter charger) and a third peripheral 305 (e.g., an external battery), according to an embodiment of the present invention. As shown in FIG. 3A, base device 300 includes a stackable receptacle connector 306 positioned within and disposed at an exterior surface (e.g., a side surface) of device housing 308. Receptacle connector 306 will be described in greater detail below with reference to FIG. 5A. Although not shown in FIG. 3A, a front-side of device 300 may include a touch screen display, a speaker and a multipurpose button housed within device housing 308 that may be made from a metallic or a polymer material. For simplicity, various internal components, such as the control circuitry, graphics circuitry, bus, memory, storage device and other components are not shown in FIG. 3A or 3B.

Figure 4A:
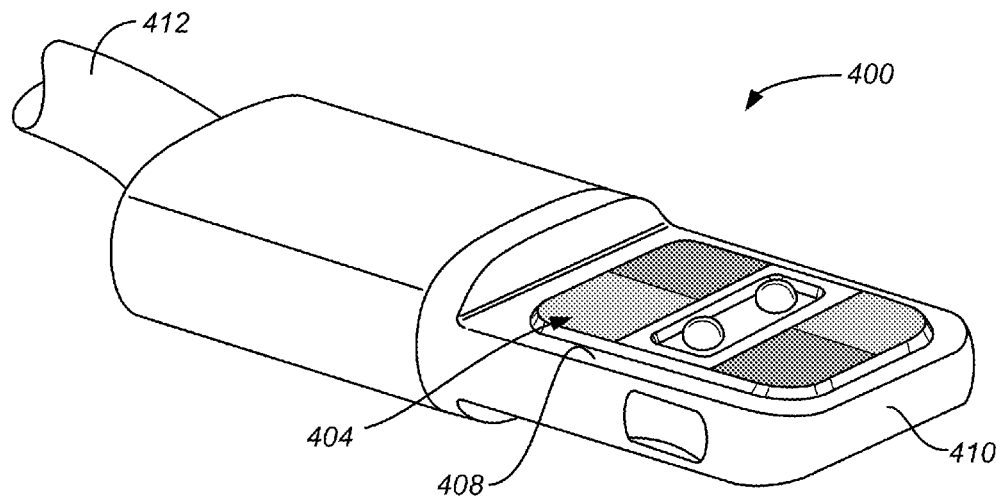
FIGS. 4A and 4B are simplified perspective views of two orientations of a connector body that includes first and second stackable connectors that can be mated with corresponding connectors, according to an embodiment of the present invention.

FIG. 3A also shows that second peripheral 304 includes a cable 310 extending to body 314 (e.g., body 204, as shown in FIGS. 2A and 2B). Second peripheral 304 may mate with first peripheral 302 via a stackable receptacle connector 316 of body 318 that is connected to second peripheral 302 via cable 322. More specifically, receptacle connector 316 may mate along insertion axis 324 with a stackable plug connector (e.g., stackable plug connector 202, as shown in FIG. 2B) of body 314. Optionally, a third peripheral 305 may be connected with both first and second peripherals 302 and 304 via stackable receptacle connector 319 and a stackable plug connector (e.g., stackable plug connector 404, as shown in FIG. 4A) of body 321 via cable 323. Once in the mated position, signals (e.g., power and/or data) may be exchanged between second peripheral 304 and first peripheral 302, or, optionally, between first peripheral 302, second peripheral 304 and third peripheral 305. Embodiments of stackable plug and receptacle connectors and associated bodies are discussed in greater detail with reference to FIGS. 2A, 2B, 4A and 4B.

As shown in FIG. 3B, first peripheral 302 may also mate with device 300, while mated (or unmated) with third peripheral 305 and/or second peripheral 304. For example, a stackable plug connector (shown in FIG. 4A), opposite receptacle connector 316 on body 318, may mate along insertion axis 326 with receptacle connector 306. Upon mating, signals (e.g., power and/or data) may be exchanged between first peripheral 302 and device 300. Furthermore, if first peripheral 302 is also mated with third peripheral 305 and/or second peripheral 304 while mated with device 300, signals may be exchanged between any of device 300, first peripheral 302, and third peripheral 305 and/or second peripheral 304. The process of transferring signals between device 300, first peripheral 302, third peripheral 305 and/or second peripheral 304, and combinations thereof is described in detail below with reference to FIG. 9.

Although device 300 is shown and described as one particular electronic media device, embodiments of the invention are suitable for use with a multiplicity of electronic devices. For example, any device that receives or transmits audio, video or data signals may be used with the invention. In some instances, embodiments of the invention are particularly well suited for use with portable electronic media devices because of their potentially small form factor. As used herein, an electronic media device includes any device with at least one electronic component that may be used to present human-perceivable media. Such devices may include, for example, portable music players (e.g., MP3 devices and Apple's iPod devices), portable video players (e.g., portable DVD players), cellular telephones (e.g., smart telephones such as Apple's iPhone devices), wearable devices such as smartwatches, video cameras, digital still cameras, projection systems (e.g., holographic projection systems), gaming systems, PDAs, desktop computers, as well as tablet (e.g., Apple's iPad devices), laptop or other mobile computers. Some of these devices may be configured to provide audio, video or other data or sensory output.

In one embodiment, the stackable connectors of device 300, first peripheral 302, second peripheral 304 and third peripheral 305 can be modular elements of the primary physical connector interface for an ecosystem of products that includes both host electronic devices and accessory devices. Examples of host devices include smart phones, portable media players, tablet computers, laptop computers, desktop computers and other computing devices. An accessory or peripheral device can be any piece of hardware that connects to and communicates with or otherwise expands the functionality of the host. Many different types of accessory devices can be specifically designed or adapted to provide signals (e.g., power and/or data) to a receptacle connector (e.g., receptacle connector 306) in order to provide additional functionality to the host (e.g., device 300).

Additionally, any of device 300, first peripheral 302, second peripheral 304 and third peripheral 305 may be replaced with any other device or accessory described herein. For example, two or more accessories and one device may be connected by stackable connectors or two or more devices and one accessory may be connected. Alternatively, two or more devices and/or two or more accessories may be connected in a stackable connector configuration. Cable assemblies that are not coupled to devices or accessories may also be interconnected via stackable connectors and include non-stackable connectors. For example, a cable assembly may include a cable extending between a traditional connector and a connector body including one or more stackable connectors. The traditional connector may be connected to a device or an accessory or even replaced with another stackable connector, thereby allowing one cable assembly to connect to two stacks of stackable connectors.

Body 314, body 308 and variations of body 314 and body 308 can be included with each accessory device that is part of the ecosystem to enable the host to provide signals to accessories when directly mated or indirectly mated via a stack of stackable connectors using a stackable receptacle connector. Examples of accessory or peripheral devices include docking stations, chargers, an external power source such as an external battery, cable adapters, clock radios, game controllers, audio equipment, headsets or earphones, video equipment and adapters, keyboards, medical sensor devices such as heart rate monitors and blood pressure monitors, point of sale (POS) terminals, as well as numerous other hardware devices that can connect to and exchange data with the host device. Various wireless communication protocols may be used to communicate data between the host device and the accessory.

It will also be appreciated that the device 300, first peripheral 302, second peripheral 304 and third peripheral 305 described above are illustrative and that various modifications are possible. For example, stackable connectors described herein as being plug connectors could be receptacle connectors and vice versa. Alternatively, plug and receptacle connectors may be replaced with flush surfaces such that all plug and receptacle stackable connectors have no physical difference in appearance. The number of stackable connectors (e.g., plug and receptacle connectors) included with device 300, first peripheral 302, second peripheral 304 and third peripheral 305 may be varied. For example, body 314 of second peripheral 304 may include two stackable connectors (plug and/or receptacle connectors) instead of a single receptacle connector as described above. Additionally, host devices and/or accessories may also include more than two stackable connectors. For example, device 300 may include three or four stackable connectors and may concurrently connect with a number of peripheral devices or accessories, host devices and combinations thereof. Stackable connectors according to the present invention may include optical elements instead of or in addition to electrical contacts for sending and/or receiving optical signals and converting signals between optical and electrical signals. For example, stackable connectors may include an optical transmitter, an optical receiver and/or an optical transceiver for communicating using electromagnetic signals (e.g., infrared data communication). Further examples and discussion of optical elements for connectors can be found in commonly owned and co-pending U.S. application Ser. No. 13/688,727, filed Nov. 29, 2012, and titled "Hybrid Optical Connector," the content of which is incorporated by reference herein in its entirety for all purposes.

As mentioned above, more details are provided herein regarding bodies 318 and 321 (shown in FIG. 3A) of first peripheral 302 and third peripheral 305, respectively; the following figures illustrate other embodiments of bodies 318 and 321.

Figure 4B:
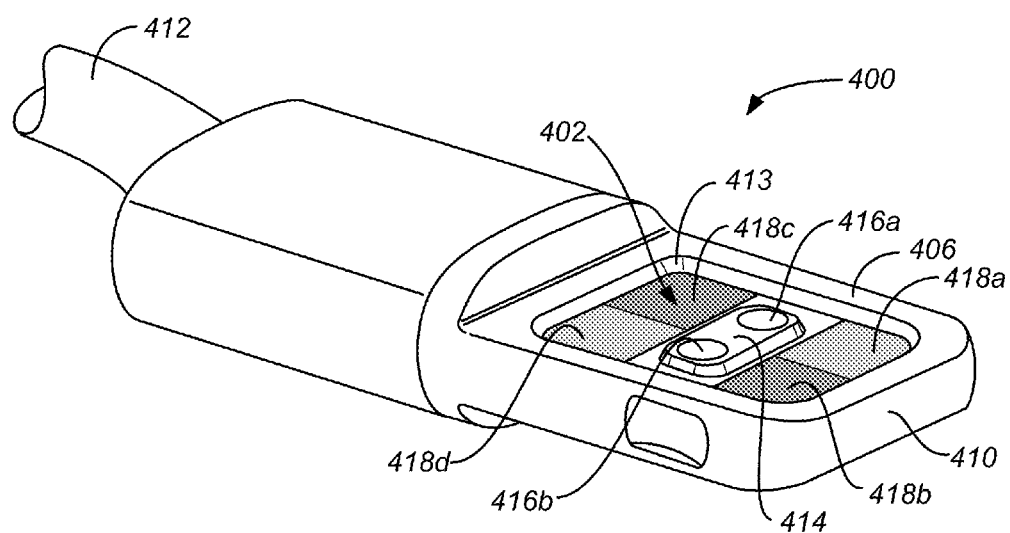

FIGS. 4A and 4B are simplified perspective views of two orientations of a connector body 400 that includes stackable connectors that can be mated with corresponding connectors (e.g., plug connector 202, as shown in FIG. 2B, and receptacle connector 306, as shown in FIG. 3A), according to an embodiment of the present invention. Body 400 may look like an Apple Lightning connector and share similarities with body 200 (shown in FIGS. 2A and 2B). Both the front and back surfaces 406, 408 of body 400 include stackable connectors, whereas body 200 only includes one stackable connector (e.g., plug connector 202) on its front surface 206. As shown in FIG. 4A, back surface 408 includes a plug connector 404. Plug connector 404 may be similar to plug connector 202 (shown in FIG. 2B) and variations thereof. Accordingly, the description above concerning and related to plug connector 202 and variations thereof may apply to plug connector 404 and is not repeated here in the interest of brevity.

Turning back to body 400, FIGS. 4A and 4B also show a side surface 410 extending between front and back surfaces 406, 408. A cable 412 extends from side surface 410 and may be coupled with an accessory (e.g., first peripheral 302, as shown in FIG. 3A), a device (e.g., device 300, as shown in FIG. 3A), another accessory (e.g., second peripheral 304, as shown in FIG. 3A) or another connector body (e.g., a stackable connector body or the body of connector 100, as shown in FIG. 1B). Cable 412 may include a number of wires coupled to internal components of body 400 (e.g., routing circuitry, as further described below with reference to FIGS. 6A-8) and accessories, main devices, connectors, or other devices to which cable 412 may also be coupled.

As shown in FIG. 4B, front surface 406 includes a rim 413 defining receptacle connector 402, which is sized and shaped to receive a protruding plug connector (e.g., plug connector 202, as shown in FIG. 2B). Receptacle connector 402 includes a protruding mating surface 414 that may contact a corresponding mating surface (e.g., mating surface 212, as shown in FIG. 2B) of another stackable connector (e.g., plug connector 202, as shown in FIG. 2B) when mated with other stackable connectors. Mating surface 414 includes first and second contacts 416a, 416b for transmitting signals (e.g., power and/or data) to corresponding, mated connectors. As shown in FIG. 4B, contacts 416a, 416b are oriented in a plane that is either the same as or parallel to the plane in which mating surface 414 is oriented. Receptacle connector 402 may be mated with a corresponding connector (e.g., plug connector 202, as shown in FIG. 2B) about an insertion axis (e.g., insertion axis 324) that is perpendicular to the plane in which contacts 416a, 416b and/or mating surface 414 are oriented.

Contacts 416a, 416b may be flat termination surfaces or they may be pogo or otherwise deflecting contacts or protruding terminals. FIG. 4B also shows magnets 418a-418d adjacent to mating surface 414. Magnets 418a-418d may have poles arranged to generate a magnetic field to orient, align and/or mate a corresponding plug connector with receptacle connector 402 therewith. For example, magnets 418b and 418c may be of the same polarity and have a polarity opposite to that of the polarity of magnets 418a and 418d. To provide this polarity, magnets 418a-418d may be permanent magnets, horseshoe magnets, ferromagnetic materials capable of magnetic attraction, rare-earth magnets, materials capable of substantially maintaining receptacle connector 402 and a corresponding plug connector in a mated position using magnetic forces or any combination thereof. Magnets 418a-418d may not only help to mate connectors but also to retain connectors in a mated position.

As will be further discussed below, signals may be provided at contacts 416a, 416b when connection detection circuitry (e.g., as discussed below following the description of FIGS. 6A-8) determines receptacle connector 402 is mated with a corresponding connector and routed using routing or switching circuitry (e.g., as discussed below with reference to FIGS. 6A-8). The connection detection circuitry may prevent live contacts from being exposed and potentially causing contact shorting that harms users, devices and/or other connectors. The routing circuitry may also be included to determine how signals should be transferred between the interconnected cable, devices, accessories, other connectors and other stackable connectors.

Although body 400 is shown and described as including two specific connectors (i.e., plug connector 404 and receptacle connector 402), embodiments of the invention may also include other types of connectors on body 400. For example, plug connector 404 could be replaced with a receptacle connector or a connector with a flush mating surface indeterminable as a plug or receptacle connector based on physical appearance. Additionally, instead of using magnets to retain mating contact between plug connector 404 and receptacle connector 402, an interference fit may be used to retain connectors in a mated position.

As mentioned above, more details are provided herein regarding receptacle connector 306 (shown in FIG. 3A) of device 300 (shown in FIG. 3A); the following figures illustrate examples of receptacle connector 306.

Figure 5A:
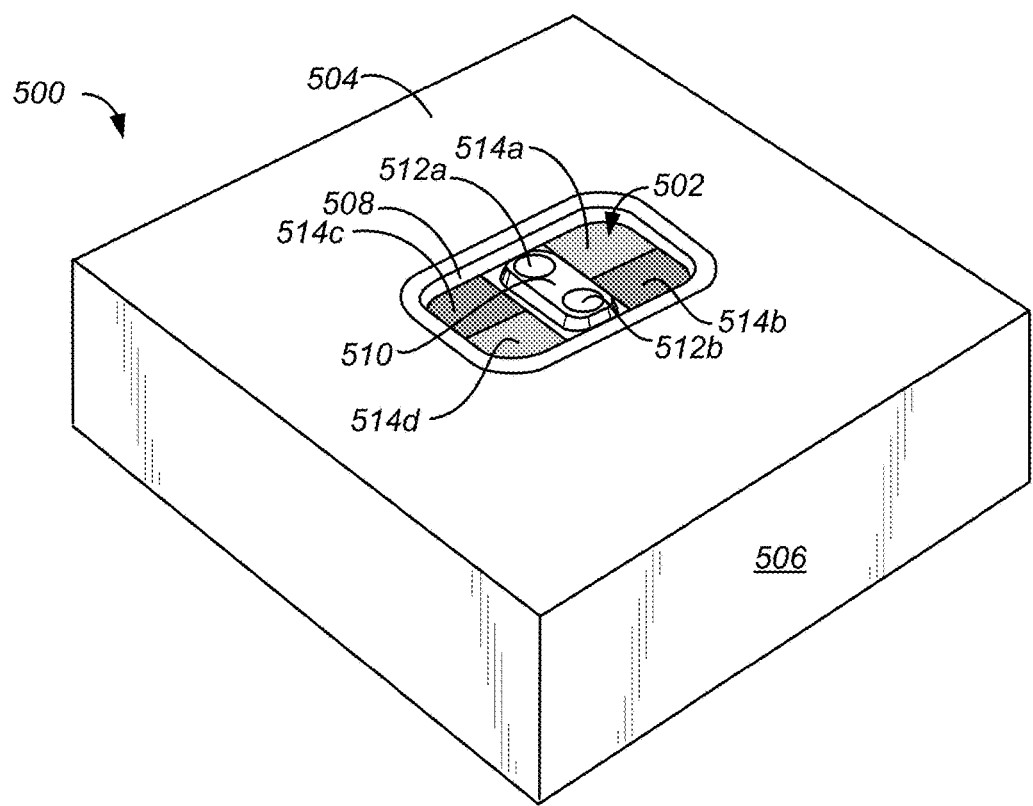
FIG. 5A is a simplified perspective view of a device including a stackable receptacle connector that can be mated with a corresponding connector, according to an embodiment of the present invention.

FIG. 5A is a simplified perspective view of a device 500 (e.g., device 300) including a stackable receptacle connector 502 that can be mated with a corresponding connector (e.g., plug connector 404, as shown in FIG. 4A or plug connector 202, as shown in FIG. 2B), according to an embodiment of the present invention. Device 500 may be the same as or similar to device 300 (shown in FIGS. 3A and 3B) and variations thereof. Accordingly, the description above concerning and related to device 300 and variations thereof may apply to device 500 and is not repeated here in the interest of brevity. Stackable receptacle connector 502 may be similar to receptacle connector 402 (shown in FIG. 4B) except that it is located on a back surface 504 of a device housing 506 whereas receptacle connector 402 is located on the back surface of a body 400 (shown in FIG. 4B). Device 500 may also include a number of wires coupled to receptacle connector 502 to provide and receive signals (e.g., data and/or power).

As shown in FIG. 5A, back surface 504 includes a rim 508 defining receptacle connector 502, which is sized and shaped to receive a protruding plug connector (e.g., plug connector 202, as shown in FIG. 2B). Receptacle connector 502 includes a protruding mating surface 510 that may contact a corresponding mating surface (e.g., mating surface 212, as shown in FIG. 2B) of another stackable connector (e.g., plug connector 202, as shown in FIG. 2B) when mated with the other stackable connector. Mating surface 510 includes first and second contacts 512a, 512b for transmitting signals (e.g., power and/or data) to corresponding, mated connectors. As shown in FIG. 5, contacts 512a, 512b are oriented in a plane that is either the same as or parallel to the plane in which mating surface 510 is oriented. Receptacle connector 502 may be mated with a corresponding connector (e.g., plug connector 202, as shown in FIG. 2B) about an insertion axis (e.g., insertion axis 326, as shown in FIG. 3A) that is perpendicular to the plane in which contacts 512a, 512b and/or mating surface 510 are oriented.

Contacts 512a, 512b may be flat termination surfaces or they may be pogo or otherwise deflecting contacts or protruding terminals. As will be further discussed below, signals may be provided at contacts 512a, 512b when connection detection circuitry (e.g., as discussed with reference to FIGS. 6A-8) determines plug connector 502 is mated with a corresponding connector and routed using routing or switching circuitry.

FIG. 5A also shows magnets 514a-514d adjacent to mating surface 510. Magnets 514a-514d may have poles arranged to generate a magnetic field to orient, align and/or mate a corresponding plug connector with receptacle connector 502. For example, magnets 514b and 514c may be of the same polarity and opposite to that of the polarity of magnets 514a and 514d. To provide this polarity, magnets 514a-514d may be permanent magnets, horseshoe magnets, ferromagnetic materials capable of magnetic attraction, rare-earth magnets, materials capable of substantially maintaining receptacle connector 402 and corresponding plug connector in a mated position using magnetic forces or any combination thereof. Magnets 514a-514d may not only help to mate connectors but also retain connectors in a mated position.

Although device 500 is shown and described herein as including one specific connector (i.e., receptacle connector 502), device 500 can also include one or more different types of connectors in addition to or instead of the connector shown in FIG. 5A. For example, receptacle connector 502 could be replaced with a plug connector (e.g., plug connector 404, as shown in FIG. 4A) or a different type of stackable connector with a flush mating surface indeterminable as a plug or receptacle connector based on physical appearance. Additionally, instead of using magnets to retain mating contact with receptacle connector 502, an interference fit may be used to retain connectors in a mated position with receptacle connector 502. Additionally, although device 500 is shown in FIG. 5A and described above as having a receptacle connector 502 located in a specific location and oriented in a specific orientation, receptacle connector 502 may also be located in a multiplicity different locations and oriented in a multiplicity different orientations. For example, receptacle connector 502 could be located in a corner location on a back side of device 500 and may be rotated 90 degrees with respect to the orientation of receptacle connector 502 shown in FIG. 5A.

Receptacle connector 502 may also be included on docking station or an adapter. For example, a docking station may include a receptacle 502 as well as a plug connector (e.g., plug connector 404, as shown in FIG. 4A). A device, e.g., device 500, may be connected with the plug connector of the docking station and receptacle connector of the docking station may be used to mate with other stackable connectors. The docking station may provide additional features to a device (e.g., device 500) or simply allow for hands-free viewing of the display of a device. Receptacle connector 502 may also be included with other docking stations and provide backwards compatibility for a device that does not include a stackable receptacle connector.

For example, a docking station may include a stackable receptacle connector (e.g., receptacle connector 502) that is incompatible with a plug connector included on the docking station, but the plug connector may be compatible with a receptacle connector of a device. The device may be mated with the plug connector of the docking station and other stackable connectors may be mated with the receptacle connector of the docking station. Conversion circuitry may be included in the docking station to convert signals received at the stackable receptacle connector to a format that can be transmitted by the plug connector of the docking station and to convert signals received from the plug connector of the docking station to a format that can be transmitted by the stackable receptacle connector of the docking station. Similarly, an adapter may include a stackable receptacle connector that is incompatible with its plug connector, but the plug connector may be compatible with a device. Further examples and discussion of conversion circuitry can be found in commonly owned U.S. Pat. No. 8,478,913, filed Nov. 16, 2012, and titled "Adapter for Electronic Devices," the content of which is incorporated by reference herein in its entirety for all purposes.

Stackable receptacle connector 502 may mate with corresponding plug connectors according to the orientations shown in FIG. 3B. However, receptacle connector 502 of device 500, and other stackable receptacle connectors discussed herein, may also mate with corresponding plug connectors that are oriented in a number of different orientations with respect to receptacle connector 502, as shown in illustrative examples in the following figures.

Figure 5B:
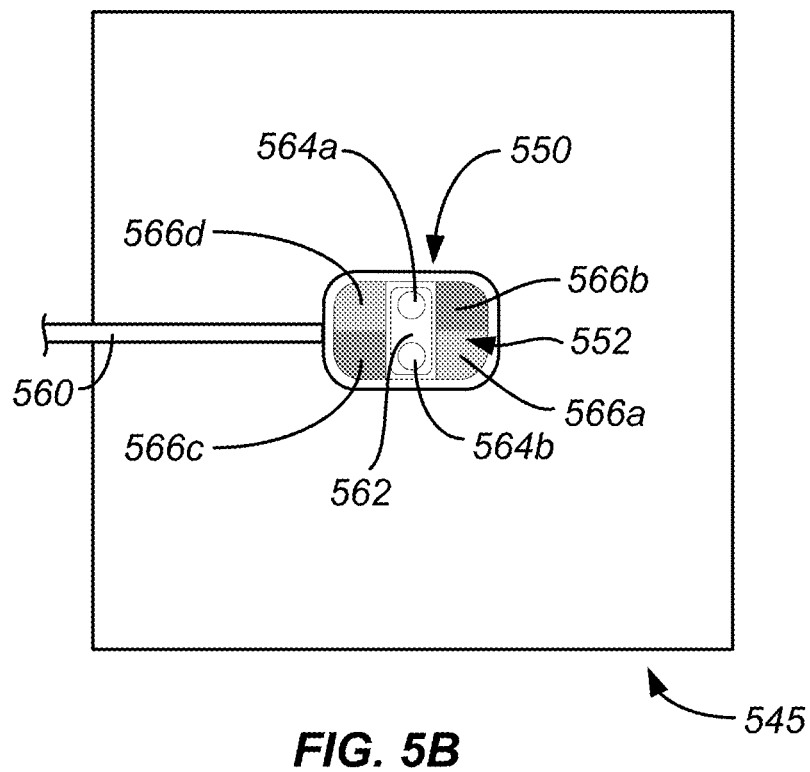
FIGS. 5B and 5C show back views of a device and a partially transparent corresponding plug connector mated with a receptacle connector of the device in two different orientations, according to an embodiment of the present invention.
Figure 5C:
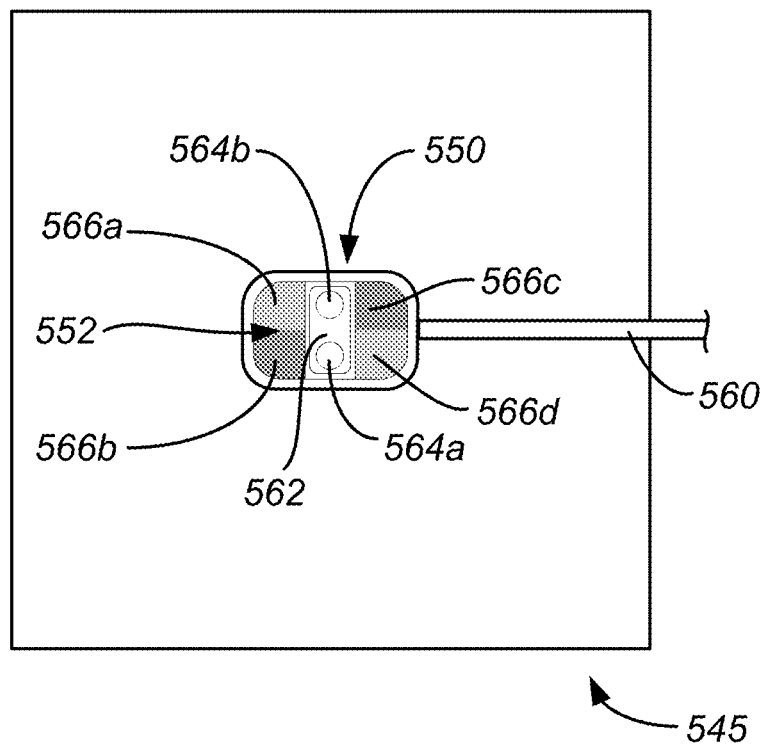

FIGS. 5B and 5C show back views of device 545 and a partially transparent body 550 including plug connector 552 (e.g., plug connector 404, as shown in FIG. 4A or plug connector 202, as shown in FIG. 2B) mated with a receptacle connector of device 545 in two different orientations, according to an embodiment of the present invention. As shown in FIGS. 5B and 5C, a plug connector 552 may be mated with a (e.g., receptacle connector 502, as shown in FIG. 5A) of device 545 in either of two orientations. Connection detection circuitry, as discussed further below, may sense the orientation of plug connector 552 with respect to the receptacle connector of device 545 and adjust the routing of signals to the contacts of these connectors accordingly. A magnetic force may orient, align, mate and retain plug connector 552 in a mated position with receptacle connector 552 in either of two orientations because the poles of the magnets of plug connector 552 are arranged in the same pattern with respect to the receptacle connector of device 545 in both of the two orientations shown in FIGS. 5B and 5C.

Plug connector 552 may be similar to plug connector 202 (shown in FIG. 2B) and variations thereof. Accordingly, the description above related to plug connector 202 and variations thereof may also be applied to plug connector 552 and thus is not repeated here in its entirety in the interest of brevity. As shown in FIGS. 5B and 5C, stackable connector body 550 is partially transparent, allowing a back view of plug connector 552 to be seen in FIGS. 5A and 5B. Body 550 is coupled to a cable 560 and includes protruding plug connector 552. A mating surface 562 includes first and second contacts 564a, 564b for transmitting signals (e.g., power and/or data) to corresponding, mated connectors. Magnets 566a-566d are adjacent to mating surface 562 and have poles arranged to generate a magnetic field that attracts a corresponding receptacle connector and orients, aligns and/or mates plug connector 552 therewith. As discussed further below, body 550 may include connection detection circuitry and routing circuitry for determining when connectors are mated, the orientation of mated connectors, and how to route signals between mated connectors.

When plug connector 552 is mated with the receptacle connector of device 545 in either of two orientations shown in FIGS. 5B and 5C, magnets 566a-566d are positioned opposite the magnets of receptacle connector of device 545 that have opposite polarities. For example, in FIG. 5B, the polarity of magnets 566a, 566b, 566c and 566d may be opposite that of opposing magnets 514b, 514a, 514d and 514c, respectively. Similarly, in FIG. 5C, the polarity of magnets 566a, 566b, 566c and 566d may be opposite that of opposing magnets 514c, 514d, 514a and 514b, respectively. As such, the poles of plug connector 552 are arranged to generate a magnetic field that attracts the corresponding receptacle connector of device 545 and orients, aligns and/or mates plug connector 552 therewith.

Although device 545 is shown and described as having magnets with specific sizes, locations and arrangements, device 545 may include magnets having a multiplicity of different sizes, locations and arrangements. For example, more magnets could be included and magnets could be circular shaped and/or positioned on side surfaces around the perimeter of the receptacle connector of device 545. Similarly, plug connector 552 and other plug connectors described herein may also be varied in a manner different from the variations listed above with reference to the receptacle connector of device 545. For example, plug connector 552 may only include one magnet sized to fill the receptacle of the receptacle connector of device 545 when mated with the receptacle connector of device 545.

As mentioned above, more details are provided herein concerning routing circuitry that may be included in the present invention to determine how signals should be transferred between stackable connectors of cable assemblies, main devices, accessory devices; the following figures illustrate examples of routing circuitry that could be included in embodiments of the present invention. Connection detection circuitry for preventing live contacts from being exposed at unmated connectors is also discussed below.

Figure 6A:
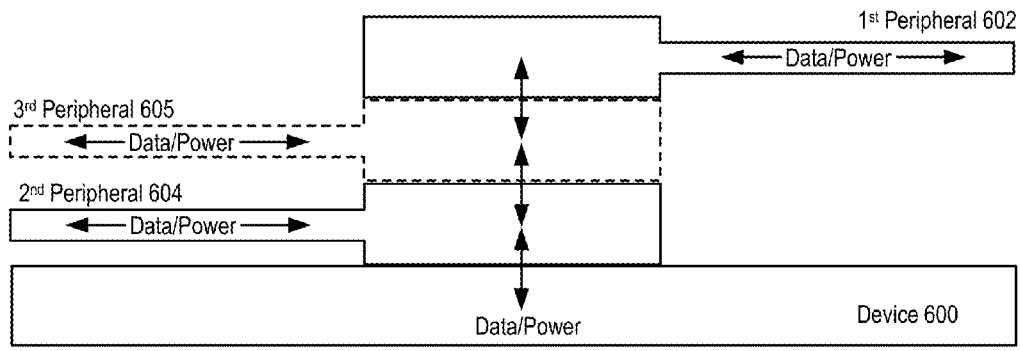
FIGS. 6A-6C are conceptual diagrams illustrating how signals are routed between a device and two or more peripherals or between two peripherals, according to embodiments of the present invention.
Figure 6B:
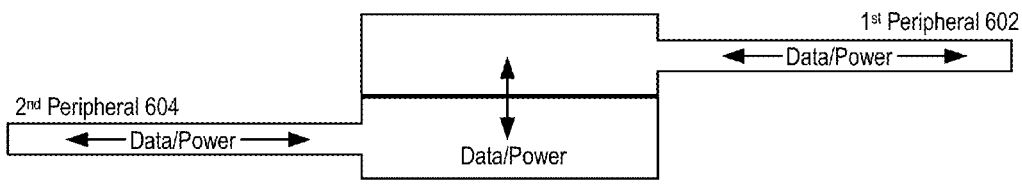
Figure 6C:
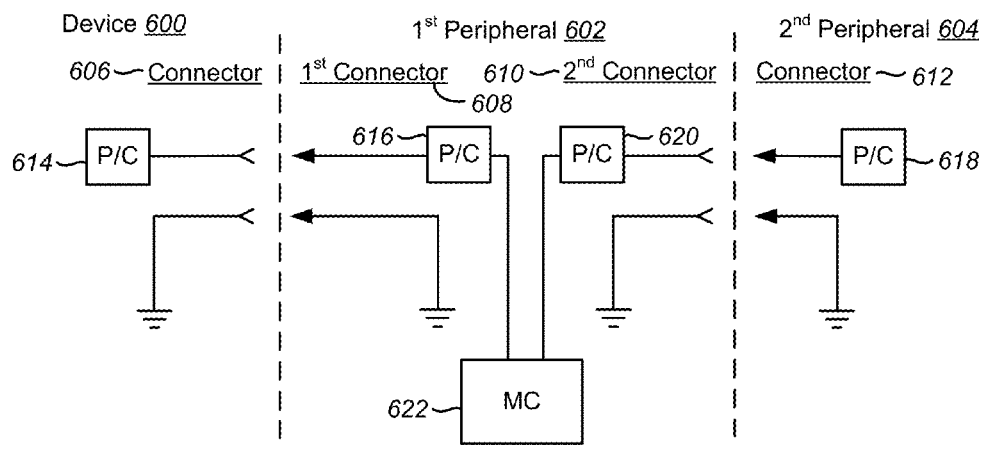

FIGS. 6A-6C are conceptual diagrams illustrating how signals are routed between a device and two or more peripherals or between two peripherals, according to embodiments of the present invention. FIG. 6A illustrates how data and power can be routed between two or three peripherals and a host device using stackable connectors, according to an embodiment of the present invention. FIG. 6B illustrates how data and power can be routed between two peripherals using stackable connectors, according to an embodiment of the present invention.

FIG. 6C illustrates interfaces of an electrical system that can use a repeater system including a microcontroller for routing signals between device 600, a first peripheral 602 (e.g., an accessory) and a second peripheral 604 (e.g., a power adapter charger).

Turning to FIG. 6A, a stackable connector of a second peripheral 604 may mate with a device 600 via a stackable connector of device 600 and data and/or power may be exchanged therebetween. The other stackable connector of second peripheral 604 may mate with first peripheral 602, while mated (or unmated) with device 600, and data and/or power may be exchanged therebetween. Optionally, stackable connectors of third peripheral 605 may be mated with corresponding stackable connectors of first and second peripherals 602 and 604, while second peripheral 604 is mated (or unmated) with the stackable connector of device 600, and data and/or power may be exchanged therebetween.

Signals (e.g., power and/or data) can be exchanged between first peripheral 602, second peripheral 604, third peripheral 605 and device 600 in a number of different ways, depending, e.g., on the peripheral type, the device type and the objective of the mating event. For example, power and/or data may be bypassed through a stackable connector and routed to the peripheral or device of another stackable connector. In a specific example where earphones, a power adapter and a smart phone are connected by stackable connectors, power may be routed from the power adapter to the device without any power being routed to the earphone while data is routed from the device to the earphones without any data being routed to the power adapter; this may be accomplished regardless of the order in which the stackable connectors of the peripherals and the device are connected. The means by which signals can be routed between device 600, first peripheral 602, second peripheral 604 and/or third peripheral 605 are discussed below with reference to FIG. 6C as well as FIGS. 7 and 8.

Turning to FIG. 6B, a stackable connector of first peripheral 602 may mate with a stackable connector of second peripheral 604 and data and/or power may be exchanged therebetween. Once mated, signals (e.g., power and/or data) can be exchanged between first peripheral 602 and second peripheral 604 in a number of different ways, depending, e.g., on the peripheral types and the objective of the mating event. In a specific example where a power adapter and an external battery are connected by stackable connectors in the configuration of FIG. 6B, power may be routed from the power adapter to the external battery without any power being routed to the power adapter, while data (e.g., data concerning charge state) is routed to the power adapter without any data being routed to the external battery. The means by which signals can be routed between stackable connectors of the first and second peripherals 602, 604 are discussed below with reference to FIG. 6C as well as FIGS. 7 and 8.

Turning to FIG. 6C, device 600, first peripheral 602 and second peripheral 604 may be interconnected using stackable connectors. More specifically, device 600 may include a stackable connector 606 that mates with first stackable connector 608 of first peripheral 602. First peripheral 602 includes a second stackable connector 610 that mates with a stackable connector 612 of second peripheral 604. Stackable connector 606 of device 600 includes one contact coupled to a power communication chip 614 and one contact coupled to ground. As shown in FIG. 6C, these contacts are coupled to corresponding contacts of a first stackable connector 608 of first peripheral 602, including one contact coupled to a power communication chip 616 and one contact coupled to ground. Stackable connector 612 of second peripheral 604 includes one contact coupled to a power communication chip 618 and one contact coupled to ground. As shown in FIG. 6C, the contacts of stackable connector 612 are coupled to corresponding contacts of a second stackable connector 610 of first peripheral 602, including one contact coupled to a power communication chip 620 and one contact coupled to ground. One or more of power communication chips 614, 616, 618 and 620 may be addressable.

In order to facilitate and control the transfer of signals between device 600, first peripheral 602 and second peripheral 604, power communication chips 616, 620 are each coupled to microcontroller 622. Microcontroller 622 may communicate with power communication chips 616, 620 to determine the signals that they are providing and/or receiving and then route signals therebetween accordingly. For example, where second peripheral 604 is providing power to second stackable connector 610, microcontroller 622 may determine to route some power to operate first peripheral 602 and device 600 or all the power to device 600. In addition, where device 600 also provides data (e.g., data related generating music at earbuds or a charge state of device 600) to first peripheral 602, microcontroller 622 may determine to route some data (e.g., music data) to first peripheral 602 and other data (e.g., charge state data) to second peripheral 604. Thus, based on the types of devices connected to first peripheral 602, microcontroller 622 may determine an appropriate signal routing scheme and route signals accordingly.

Although the electrical system is shown as including one microcontroller 622, additional microcontrollers (e.g., microcontroller 622) may be included in this electrical system to provide additional functionality or to obviate the need for microcontroller 622. Furthermore, where additional or fewer and/or other devices are interconnected using this stackable connector interface, additional microcontrollers may be required in order to properly route signals between devices, as signals may be provided in any direction between devices connected using the stackable connector interface of the present invention.

Figure 7:
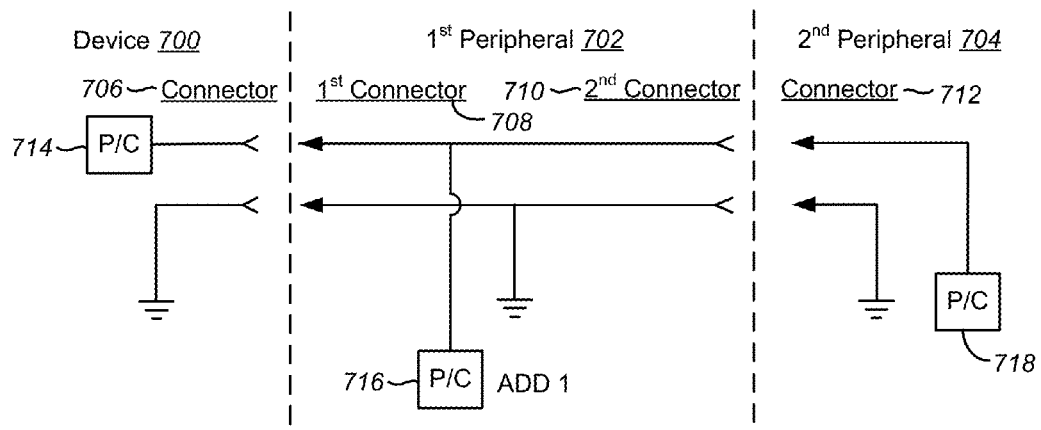
FIGS. 7 and 8 illustrate electronic systems including routing circuitry for routing signals between a device, a first peripheral and a second peripheral.
Figure 8:
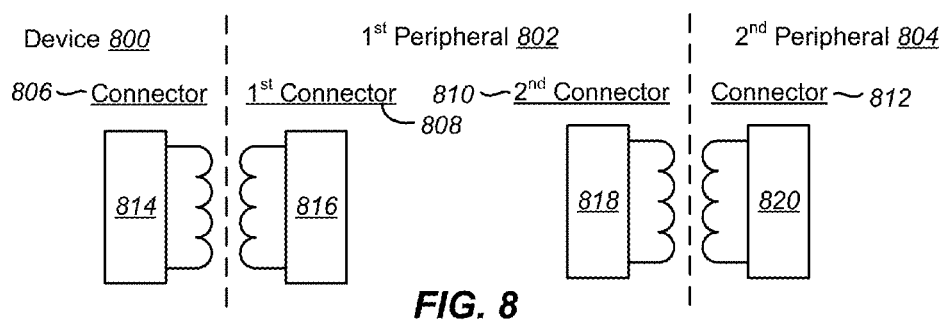

FIGS. 7 and 8 illustrate electronic systems including routing circuitry for routing signals between a device, a first peripheral and a second peripheral. FIG. 7 illustrates the interfaces for a multi-drop electrical system for routing signals between a device 700, a first peripheral 702 (e.g., an accessory) and a second peripheral 704 (e.g., power adapter charger). FIG. 8 illustrates the interfaces for a coil-based repeater electrical system for routing signals between a device 800, a first peripheral 802 (e.g., an accessory) and a second peripheral 804 (e.g., a power adapter charger).

Turning to FIG. 7, a device 700, a first peripheral 702 and a second peripheral 704 may be interconnected using stackable connectors and exchange signals therebetween using a multi-drop electrical system for routing signals. More specifically, device 700 may include a stackable connector 706 that mates with first stackable connector 708 of first peripheral 702. First peripheral 702 includes a second stackable connector 710 that mates with a stackable connector 712 of second peripheral 704. Stackable connector 706 of device 700 includes one contact coupled to a power communication chip 714 and one contact coupled to ground. As shown in FIG. 7, these contacts of stackable connector 706 are coupled to corresponding contacts of a first stackable connector 708 of first peripheral 702, including one contact coupled to a contact of a second stackable connector 710 and a power communication chip 716 and one contact coupled to ground. Stackable connector 712 of second peripheral 704 includes one contact coupled to a power communication chip 718 and one contact coupled to ground. As shown in FIG. 6C, the ground contact of stackable connector 712 may be coupled to a common ground contact of a first and second stackable connector 708 and 710, of first peripheral 702. One or more of power communication chips 614, 616, 618 and 620 may be addressable.

In this configuration signals are routed along a direct communication path between second peripheral 704 and device 700 via first and second connectors of first peripheral 702. Power communication chip 716 may also merge its signals along this communication path. For example, where second peripheral 604 is providing power to second stackable connector 610, power may be routed directly to device 600, but may also be dropped at power communication chip 716 to provide power to first peripheral 702. Data from device 700 may also be dropped in this configuration at first peripheral 702 and second peripheral 704.

Similar to the electrical system of FIG. 6C, additional devices may be interconnected to the electrical system of FIG. 7. Where additional or fewer devices are interconnected using this stackable connector interface, signals provided from multiple sources may be dropped at multiple devices along the stackable connector interface.

Turning to FIG. 8, a device 800, a first peripheral 802 and a second peripheral 804 may be interconnected using stackable connectors and exchange signals therebetween using a coil-based repeater electrical system for routing signals. More specifically, device 800 may include a stackable connector 806 that mates with first stackable connector 808 of first peripheral 802. First peripheral 802 includes a second stackable connector 810 that mates with a stackable connector 812 of second peripheral 804. Induction can be used to transfer signals between stackable connectors and each stackable connector 806, 808, 810 and 812 houses components to facilitate inductive charging, including inductive charging coils (e.g., transmission or receiving coils), as shown in FIG. 8. More specifically, stackable connectors 806, 808, 810 and 812 include inductive charging coils 814, 816, 818 and 820, respectively. Inductive charging coils 816 and 820 may be inductive transmission coils that induce a current in inductive charging coils 814 and 818, respectively, which are receiving coils. In this manner, second peripheral 804 may provide power to first peripheral 802, which power may be passed in whole or in part to device 800.

Magnetic polarity may be used to properly mate stackable connectors such that connectors including inductive transmission coils are mated with connectors including inductive receiving coils. For example, magnets (e.g., magnets 216a-216d) may be included that have poles arranged to generate a magnetic field that attracts connectors having the proper inductive transmission or receiving coils. As such, if two stackable connectors that include inductive transmission coils are brought in proximity, a magnetic force may repel the connectors from each other, indicating that the connectors have not been properly aligned to enable inductive charging to occur.

In some embodiments, the inductive outlined above may be Qi or PMA Inductive charging and transition-minimized differential signaling (TDM) and/or radio frequency (RF) data communication may also be used in the electrical charging scheme of FIGS. 6A-8. A microcontroller (e.g., microcontroller 622) could also be used to manage the data flow in these embodiments. As mentioned previously, each of the devices, accessory devices, and other devices discussed with regard to any embodiments may be interchangeable with other main devices, accessory devices and other devices, including the devices described with references to FIGS. 6A-9.

In addition to routing circuitry, connection detection circuitry may also be used to manage the flow of signals between stackable connectors. This connection detection circuitry may determine when signals should be provided at contacts of stackable connectors (e.g., when connectors are mated) and which signals should be provided at each contact of stackable connectors (e.g., depending on the orientation in which a connector is mated with another). Sensors such as Hall Effect sensors, resistance sensors and rotational encoders may provide inputs for connection detection circuitry. Examples and discussion of sensing electrical and/or magnetic characteristics of contacts and/or connectors to determine plug connector type, connections and orientation can be found in the following commonly owned United States patents and patent application: U.S. Pat. No. 7,589,536, filed Jan. 5, 2007, titled Systems and Methods for Determining the Configuration of Electronic Connections; U.S. Pat. No. 7,863,906, filed Jul. 2, 2009, titled Systems and Methods for Determining the Configuration of Electronic Connections; U.S. patent application Ser. No. 13/455,115, filed Apr. 24, 2012, titled Universal Connector; and U.S. patent application Ser. No. 13/442,651, filed Apr. 9, 2012, titled A Receptacle Connector with Circuitry for Determining the Configuration of a Corresponding Plug Connector Mated Therewith which are incorporated by reference herein in their entirety for all purposes.

In some embodiments, a rotary encoder may be included with stackable connectors that provides inputs to devices or accessories based on changes in detected magnetic fields or sensed electrical characteristics. For example, as the orientation of a stackable plug connector mated with a stackable receptacle connector changes, the encoder may provide a command (e.g., change device volume, change the song playing on the device or change the picture displayed on a device). As another example, orienting a mated plug connector (e.g., plug connector 552, as shown in FIG. 5B) as shown in FIG. 5B, may turn on a device (e.g., device 545, as shown in FIG. 5B), while orienting the mated plug connector as shown in FIG. 5A may turn off the device.

The following figure further illustrates ways in which the routing circuiting and connection detection circuitry described above may be used to control the flow of signals between mated stackable connectors coupled to main devices and accessories.

Figure 9:
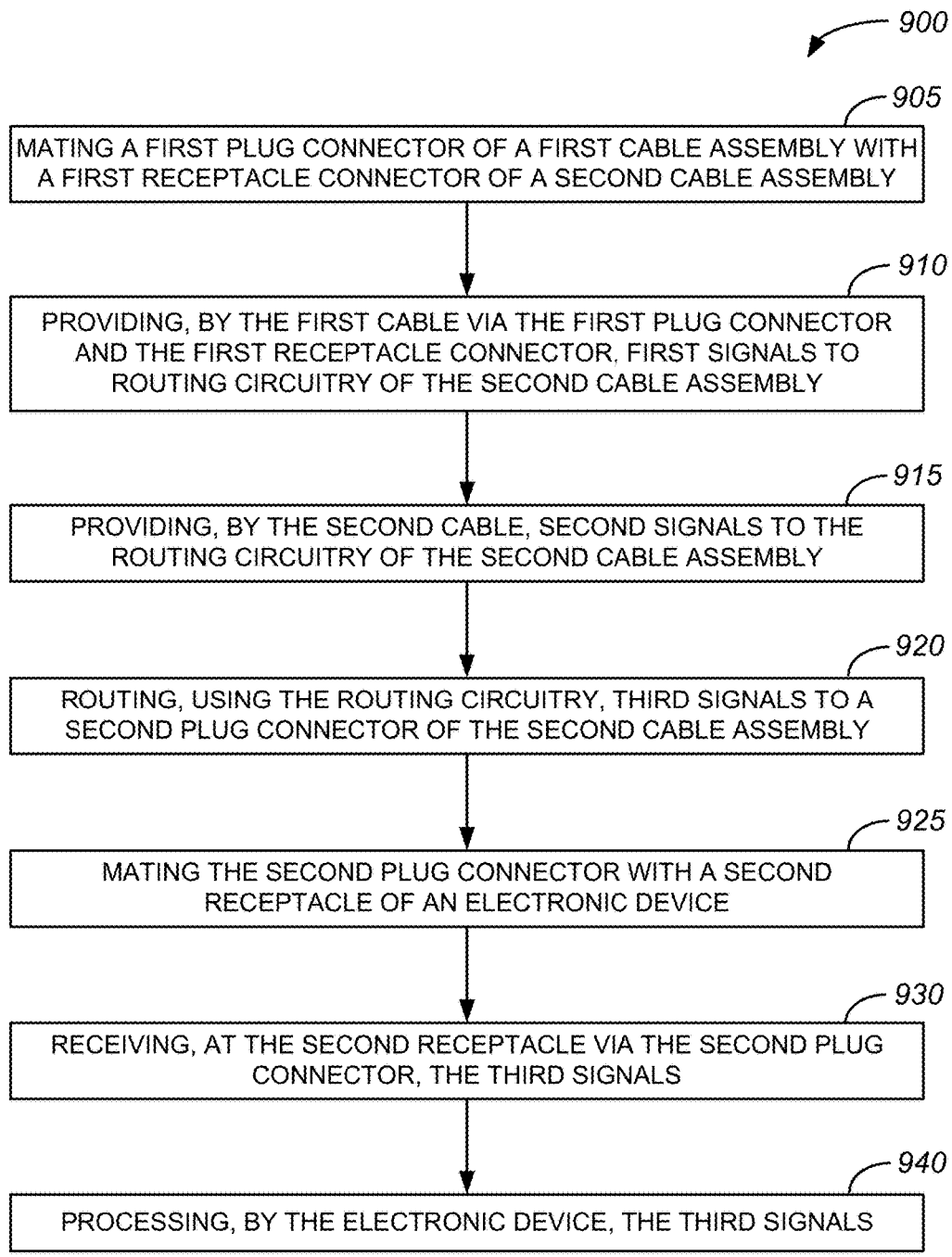
FIG. 9 illustrates steps of a method for forming an electrical connection between stackable connectors.

FIG. 9 illustrates steps of a method 900 for forming an electrical connection between stackable connectors. Method 900 may be used to route signals provided between main devices and accessories interconnected via a stackable connector interface.

At a step 905, a first stackable plug connector (e.g., plug connector 202, as shown in FIG. 2B) of a first cable assembly (e.g., the cable assembly portion of second peripheral 304, as shown in FIG. 3A) may be mated with a first stackable receptacle connector (e.g., receptacle connector 402, as shown in FIG. 4B) of a second cable assembly (e.g., the cable assembly portion of first peripheral 302, as shown in FIG. 3A). The first plug connector may protrude from a front surface of a connector body (e.g., body 200, as shown in FIG. 2B) and be coupled to a first cable (e.g., cable 210, as shown in FIG. 2A) via the body. The first receptacle connector may be formed at a back surface of a connector body (e.g., body 400) and coupled to a cable (e.g., cable 412, as shown in FIG. 4B) via the body. In the mated position, the contacts of the first and second connector bodies may be in contact with each other and magnets may provide a magnetic attraction force to orient, align, mate and retain the connectors in the mated position (e.g., as shown in FIG. 3B).

At a step 910, first signals may be provided to routing circuitry (e.g., the routing circuitry described with reference to FIGS. 6A-8 or variations thereof) of the second cable assembly. These signals may originate from a device or connector attached to the cable of the first cable assembly and travel across one or more of wires of the cable to the first plug connector. The first signals may be provided to contacts of the first plug connector when connection detection circuitry (e.g., the connection detection circuitry referenced and described above) detects that the first plug connector is mated with the first receptacle connector. The first signals provided to the first plug connector may be received by contacts of the first receptacle connector when it is mated with the first plug connector. The first receptacle connector may be coupled to routing circuitry housed in the connector body that forms the receptacle of first receptacle connector, thereby allowing the first signals to be provided to the routing circuitry (e.g., a microcontroller and other routing elements).

At a step 915, second signals may be provided to routing circuitry (e.g., the routing circuitry described with reference to FIGS. 6A-8 or variations thereof) of the second cable assembly. These signals may originate from a device or connector attached to the cable of the second cable assembly and travel across one or more of wires of the cable to the routing circuitry. The second signals may be provided to the routing circuitry when connection detection circuitry (e.g., the connection detection circuitry referenced and described above) detects that the first plug connector is mated with the first receptacle connector or when a second stackable plug connector of the second cable assembly is mated with a second stackable receptacle connector of a device. As such, the routing circuitry can route the first and second signals, which routing may be based upon a number of predetermined factors and/or the content of the signals received. For example, the routing circuitry may always route signals received from a power adapter cable to any main devices interconnected with the second cable assembly via stackable connectors, while signals may be routing from a device to earphones when the routing circuitry determines that data for generating sound at earbuds is included in the signals.

At a step 920, the routing circuitry routes third signals to the second plug connector of the second cable assembly. These signals may be provided at the contacts of the second plug connector. The third signals may include one or more signals of the first and second signals. For example, the first cable assembly may provide power to the device and the second cable assembly may provide data indicating that it is capable of receiving data for generating music at headphones. Once again, connection detection circuitry may be coupled to the routing circuitry to determine when this mating has occurred and only provide signals or only allow the routing circuitry to provide the signals when the second plug connector is mated with the second receptacle connector.

Although the direction of signal flow described above is unidirectional, bidirectional data may be provided between any devices connected using the stackable connector interface. For example, data and power may flow both ways between accessories, even if only two accessories are connected by stackable connectors. Data and power may also flow both ways between each of a device and two accessories. As yet another example, data and power may flow both ways between each of two accessories, a device and a power adapter charger. Many other signal flow schemes may be achieved by implementing routing circuitry in one or more cable assemblies of various types.

At a step 925, the second plug connector of the second cable assembly may be mated with a second receptacle connector of an electronic device, thereby allowing signals to be communicated between contacts of the second plug connector and the second receptacle connector.

At a step 930, the third signals may be received at the second receptacle, which signals were provided by the second plug connector. Again, the signals may be provided to the second receptacle connector via the contact established between the contacts of the second plug connector and the second receptacle connector.

At a step 935, the third signals may be processed by the electronic device. For example, power may be used by charging circuitry to charge an internal battery of the device. As another example, data may be interpreted as commands and/or requests for the device to perform actions, e.g., provide music data to earphones or speakers.

As with other connector bodies including stackable connectors described herein, first and second plug connectors and first and second receptacle connectors may be interchanged in other embodiments, as with the devices connected to the first and second cable assemblies. Alternatively, another connector body having stackable or other connectors may be connected to the cable assembly instead of a device. Furthermore, additional cable assemblies like the second cable assembly may be connected using method 900 by replacing the device with another cable assembly, foregoing step 935 and repeating steps 915-935 for the additional cable assembly and a device or just steps 915-930 for an additional cable assembly that is not connected to a device.

While the figures and description above were directed to stackable plug connector having two contacts or no contacts, some embodiments of the present invention may include more than two contacts and have different form factors. The following figures illustrate examples of stackable connectors having three contacts.

B. A Three Contact, Stackable, Magnetically-Retained Connector Interface

Figure 10A:
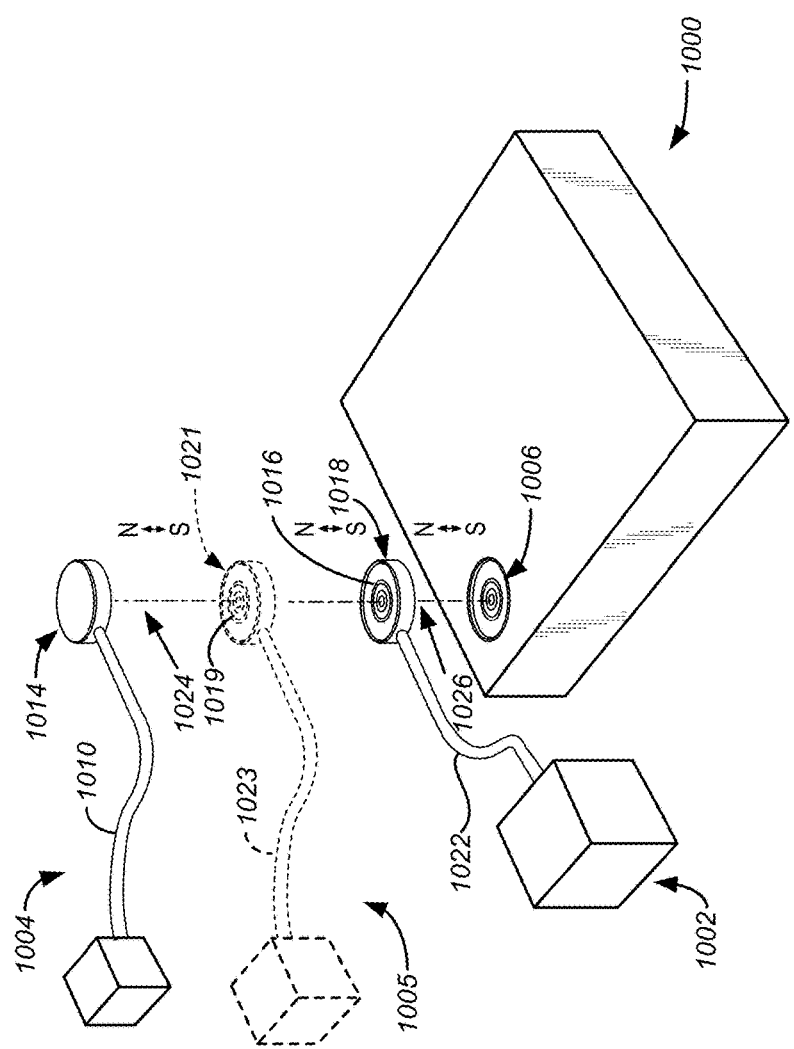

FIGS. 10A and 10B illustrate unmated and mated stackable connectors, respectively, of base device 1000, a first peripheral 1002 (e.g., earphones), a second peripheral 1004 (e.g., power adapter charger) and a third peripheral 1005 (e.g., an external battery), according to an embodiment of the present invention. As shown in FIG. 10A, base device 1000 includes a stackable receptacle connector 1006 positioned within and disposed at an exterior surface (e.g., a back surface) of the housing of device 1000. Receptacle connector 1006 will be described in greater detail below with reference to FIG. 5. Device 1000 may be the same as or similar to device 300 (shown in FIGS. 3A and 3B) and variations thereof, except that it includes a different stackable receptacle connector than device 300. Accordingly, the description above concerning and related to device 300 and variations thereof may apply to device 1000 and is not repeated here in the interest of brevity.

FIG. 10A also shows that second peripheral 1004 includes a cable 1010 extending to a connector body 1014. Second peripheral 1004 may mate with first peripheral 1002 via a stackable receptacle connector 1016 of body 1018 that is connected to second peripheral 1004 via cable 1022. More specifically, receptacle connector 1016 may mate along insertion axis 1024 with a stackable plug connector (e.g., stackable plug connector 1102, as shown in FIG. 10B) of body 1014. Once in the mated position, signals (e.g., power and/or data) may be exchanged between second peripheral 1004 and first peripheral 1002, or, optionally, between first, second and third peripherals 1002, 1004, 1005. Embodiments of connector stackable plug and receptacle connectors and associated bodies will be discussed in greater detail below with reference to FIGS. 11A-12B.

Figure 12A:
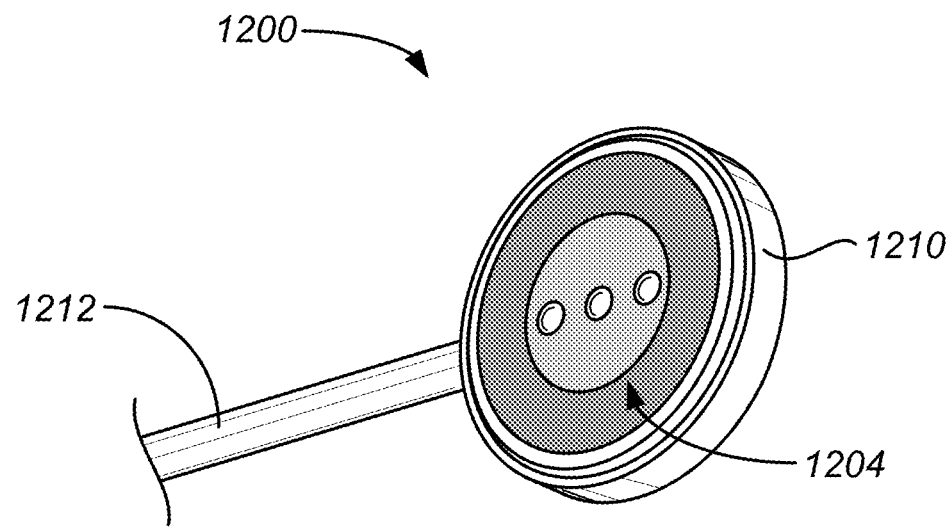
FIGS. 12A and 12B are simplified perspective views of a body including first and second stackable connectors that can be mated with corresponding connectors, according to an embodiment of the present invention.

As shown in FIG. 10B, first peripheral 1002 may also mate with device 1000, while mated (or unmated) with third peripheral 1105 and/or second peripheral 1004. As shown in FIG. 10B, first peripheral 1002 may be mated with device 1000. More specifically, a stackable plug connector (e.g., stackable plug connector 1102, as shown in FIG. 12A) opposite receptacle connector 1016 on body 1018, may mate along insertion axis 1026 with receptacle connector 1006. Upon mating, signals (e.g., power and/or data) may be exchanged between first peripheral 1002 and device 1000. Furthermore, if first peripheral 1002 is also mated with third peripheral 305 and/or second peripheral 1004 while mated with device 1000, signals may be exchanged between any of device 1000, first peripheral 1002, and third peripheral 1005 and/or second peripheral 1004. The process of transferring signals between device 1000, first peripheral 1002 and second peripheral 1004 may be the same as or similar to the process for device 300, first peripheral 302 and second peripheral 304 and variations thereof, as outlined in above in FIG. 9. Accordingly, the description above concerning method 900 and variations thereof may be applied to device 1000, first peripheral 1002, third peripheral 1005 and/or second peripheral 1004 and variations thereof and is not repeated here in the interest of brevity.

In one embodiment, the stackable connectors of device 1000, first peripheral 1002, second peripheral 1004 and third peripheral 1005 can be modular elements of the primary physical connector interface for an ecosystem of products that includes both host electronic devices and accessory devices. Examples of host devices include smart phones, portable media players, tablet computers, laptop computers, desktop computers and other computing devices. An accessory or peripheral device can be any piece of hardware that connects to and communicates with or otherwise expands the functionality of the host. Many different types of accessory devices can be specifically designed or adapted to provide signals (e.g., power and/or data) to a receptacle connector (e.g., receptacle connector 1006) in order to provide additional functionality for the host (e.g., device 1000).

Additionally, any of device 1000, first peripheral 1002, second peripheral 1004 and third peripheral 1005 may be replaced with any other device or accessory described herein. For example, two or more accessories and one device may be connected by stackable connectors or two or more devices and one accessory may be connected. Alternatively, two or more devices and/or two or accessories may be connected in a stackable connector configuration. As yet another example, cable assemblies that are not coupled to devices or accessories may include stackable connectors as well as other connectors. For example, a cable assembly may include a cable extending between a traditional connector and a connector body including one or more a stackable connectors. The traditional connector may be connected to a device or an accessory or even replaced with another stackable connector, thereby allowing one cable assembly to connect to two stacks of stackable connectors.

Body 1014, body 1008 and variations of body 1014 and body 1008 can be incorporated into each accessory device that is part of the ecosystem to enable the host to provide signals to accessories when directly mated or mated via a stack of stackable connectors with a corresponding receptacle connector of the host device. Examples of accessory or peripheral devices include docking stations, chargers, an external power source such as an external battery, cable adapters, clock radios, game controllers, audio equipment, headsets or earphones, video equipment and adapters, keyboards, medical sensors such as heart rate monitors and blood pressure monitors, point of sale (POS) terminals, as well as numerous other hardware devices that can connect to and exchange data with the host device. Various wireless communication protocols may be used to communicate data between the host device and the accessory.

It will also be appreciated that the device 1000, first peripheral 1002, second peripheral 1004 and third peripheral 1005 described above are illustrative and that various modifications are possible. For example, stackable connectors described above as being plug connectors could be receptacle connectors and vice versa. Alternatively, plug and receptacle connectors may be replaced with flush surfaces such that all plug and receptacle stackable connectors have no physical difference in appearance. The number of stackable connectors (e.g., plug and receptacle connectors) included with device 1000, first peripheral 1002, second peripheral 1004 and third peripheral 1005 may also be varied. For example, body 1014 of second peripheral 1004 may include two stackable connectors (plug and/or receptacle connectors) instead of a single receptacle connector as described above. Additionally, host devices and/or accessories may also include more than two stackable connectors. For example, device 1000 may include three or four stackable connectors and may concurrently connect via stackable connectors with a number of peripheral devices or accessories, host devices and combinations thereof.

As mentioned above, more details are provided herein regarding connector body 1014 of second peripheral 1004; the following figures illustrate examples of body 1014.

Figure 11A:
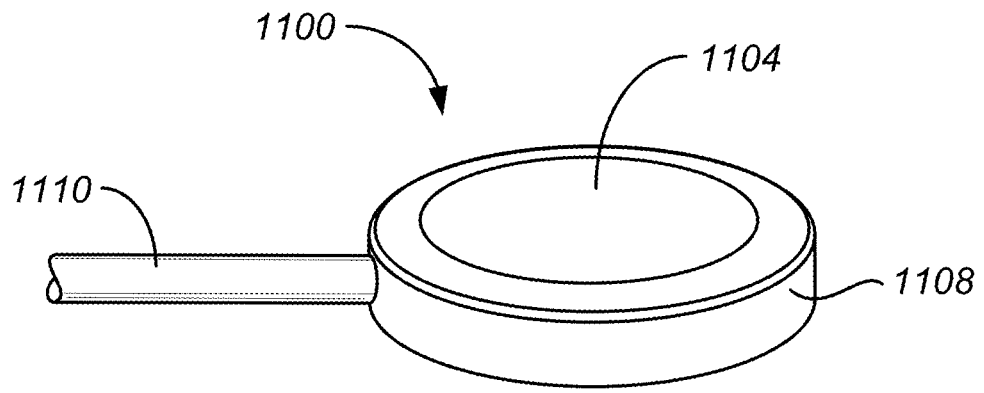
FIGS. 11A and 11B are simplified perspective views of a connector body including a stackable connector that can be mated with a corresponding connector, according to an embodiment of the present invention.
Figure 11B:
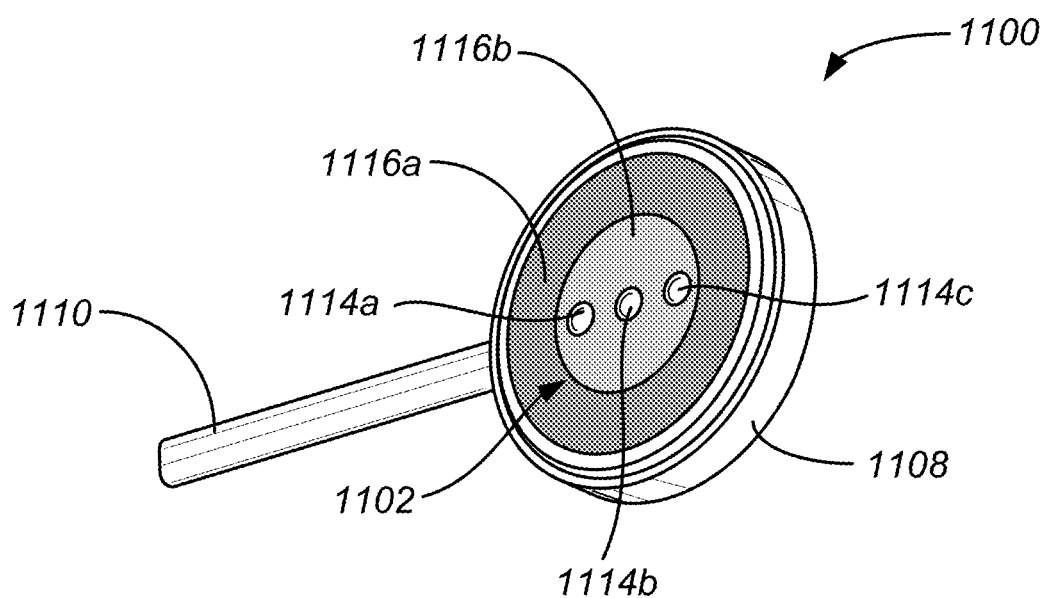

FIGS. 11A and 11B are simplified perspective views of a connector body 1000 (e.g., body 314, as shown in FIGS. 3A and 3B) including a stackable connector 1102 that can be mated with a corresponding connector (e.g., connector 1016 shown in FIG. 10A), according to an embodiment of the present invention. As shown in FIGS. 11A and 11B, body 1100 includes a back surface 1104, plug connector 1102 positioned opposite back surface 1104 and a side surface 1108 extending between back surface 1104 and plug connector 1102. A cable 1110 extends from side surface 1108 and may also be coupled with a peripheral (e.g., earphones or a power adapter charger), a device (e.g., device 300, as shown in FIG. 3A), or another connector body (e.g., stackable connector bodies 1014, 1018 and 1021, as shown in FIG. 10A. Cable 1110 may include a number of wires coupled to internal components (e.g., routing circuitry, as further described below) of body 1100 and accessories, main devices, connectors, and other devices to which cable 1110 may also be coupled.

As shown in FIG. 11B, a plug connector 1102 includes first and second magnetic elements 1116a, 1116b that may define a mating surface that corresponds to a mating surface of a stackable receptacle connector (e.g., connectors 1016 and 1019, as shown in FIG. 10A). First, second and third contacts 1114a-1114c may protrude from second magnetic element 1116b and may transmit signals (e.g., power and/or data) to corresponding, mated connectors. As shown in FIG. 11B, contacts 1114a-1114c are oriented in a plane that is either the same as or parallel to the plane in which first and second magnetic elements 1116a, 1116b are oriented. Plug connector 1102 may be mated with a corresponding connector (e.g., receptacle connector 1016, as shown in FIG. 10A) about an insertion axis (e.g., insertion axis 1024) that is perpendicular to the planes in which contacts 1114a-1114c and/or magnetic elements 1116a, 1116b are oriented.

Contacts 1114a-1114c may be pogo or otherwise deflecting contacts, flat termination surfaces or protruding terminals. For example, contacts 1114b may be a power/data pogo pin and contacts 1114a and 1114c may be stamped from a single piece of material and serve as ground contacts. Magnetic element 1116a may be a ring magnet having a single polarity or multiple polarities and magnetic element 1116b may be ferrous material. Thus, magnetic elements 1116a, 1116b may have poles arranged to generate a magnetic field that attracts a corresponding receptacle connector and orients, aligns and/or mates plug connector 1102 therewith. Magnetic elements 1116a, 1116b may also be permanent magnets, horseshoe magnets, ferromagnetic materials capable of magnetic attraction, rare-earth magnets, materials capable of substantially maintaining plug connector 1102 and a corresponding receptacle connector in a mated position using magnetic forces or any combination thereof. Magnetic elements 1116a, 1116b may not only help to mate connectors but also to retain stackable connectors in a mated position.

Signals may be provided at contacts 1114a-1114c when connection detection circuitry determines plug connector 1102 is mated with a corresponding connector and routed using routing or switching circuitry. The connection detection circuitry may prevent live contacts from being exposed and potentially causing contact shorting that harms users, devices and/or connectors. The routing circuitry may also be included to determine how signals should be transferred between the interconnected cable, devices, accessories, other connectors and other stackable connectors. Accordingly, the same or similar routing circuitry and connection detection circuitry and variations thereof may be included in plug body 1100. Accordingly, the description above concerning method 900 and variations thereof may apply to body connector 1100 and is not repeated here in the interest of brevity. Body connector 1110 may also include a printed circuit in addition to or instead of the connection detection circuitry and the routing circuitry discussed herein.

Although body 1100 is shown and described as including one plug connector (i.e., plug connector 1102), embodiments of the invention may also include other types of connectors on body 1100. For example, plug connector 1102 could be replaced with a receptacle connector or a connector with a flush mating surface indeterminable as a plug or receptacle connector based on physical appearance. Additionally, instead of using magnets to retain mating contact with connector 1102, an interference fit may be used to retain connectors in a mated position with connector 1102.

As mentioned above, more details are provided herein regarding bodies 1018 and 1021 (shown in FIG. 10A) of first peripheral 1002 and third peripheral 1005; the following figures illustrate examples of bodies 1018 and 1021.

Figure 12B:
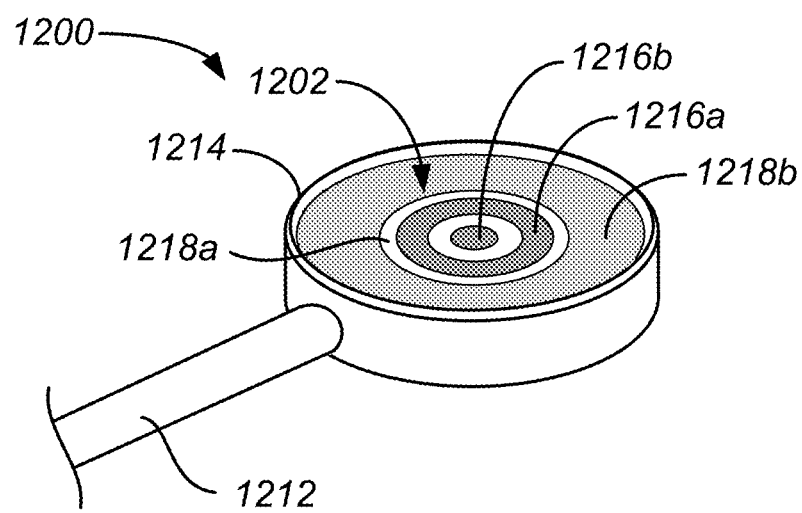

FIGS. 12A and 12B are simplified perspective views of a body 1200 including first and second stackable connectors 1202, 1204 that can be mated with corresponding connectors (e.g., plug connector 1102, as shown in FIG. 11B and receptacle connector 1006, as shown in FIG. 10A), according to an embodiment of the present invention. Body 1200 may be similar to body 1100 (shown in FIGS. 11A and 11B) except that both front and back sides of body 1200 include stackable connectors, whereas body 1100 only includes one stackable connector (e.g., plug connector 1102) on its front surface. As shown in FIG. 12A, connector body 1200 includes a plug connector 1204. Plug connector 1204 may be the same as or similar to plug connector 1102 (shown in FIG. 11B) and variations thereof. Accordingly, the description above concerning and related to plug connector 2202 and variations thereof may apply to plug connector 1204 and is not repeated here in the interest of brevity.

Turning back to body 1200, FIGS. 12A and 12B also show a side surface 1210 extending between stackable plug and receptacle connectors 1204, 1202. A cable 1212 extends from side surface 1210 and may also be coupled with an accessory (e.g., earphones or a power adapter charger), a device (e.g., device 1000, as shown in FIG. 10A), or another connector body (e.g., a stackable connector body or the body of connector 100, as shown in FIG. 1B). Cable 1212 may include a number of wires coupled to internal components (e.g., routing circuitry, as further described above with reference to FIGS. 6A-8) of body 1200 and accessories, main devices, connectors, or any more devices to which cable 1212 may also be coupled.

As shown in FIG. 12B, front surface receptacle connector 1202 includes a rim 1214 defining the receptacle of receptacle connector 1202, which is sized and shaped to receive a protruding plug connector (e.g., plug connector 1102, as shown in FIG. 11B). Receptacle connector 1202 includes circular and ring contacts 1216a, 1216b for transmitting signals (e.g., power and/or data) to corresponding, mated connectors. Circular contacts 1216a may connect with a single contact (e.g., contacts 1114b, shown in FIG. 11B), while different portions of ring contact 1216b may connect with multiple contacts (e.g., contacts 1114a, 1114c). As shown in FIG. 12B, ring contacts 1216a, 1216b are oriented in a plane and receptacle connector 1202 may be mated with a corresponding connector (e.g., plug connector 1102, as shown in FIG. 11B) about an insertion axis (e.g., insertion axis 1024) that is perpendicular to the plane in which contacts 1216a, 1216b are oriented.

Contacts 1216a, 1216b may be flat termination surfaces as shown in FIG. 12B or they may also be pogo or otherwise deflecting contacts or protruding terminals. Magnets 1218a, 1218b may have poles arranged to generate a magnetic field to orient, align and/or mate a corresponding plug connector with receptacle connector 1202. For example, the polarity of magnets 1218a and 1218b may be opposite to that of corresponding magnets 1116a, 1116b of plug connector 1102. To provide this polarity, magnets 1218a, 1218b may be permanent magnets, horseshoe magnets, ferromagnetic materials capable of magnetic attraction, rare-earth magnets, materials capable of substantially maintaining receptacle connector 402 and a corresponding plug connector in a mated position using magnetic forces or any combination thereof. Magnets 1218a, 1218b may not only help to mate connectors but also to retain connectors in a mated position.

As further discussed above, signals may be provided at contacts 1216a, 1216b when connection detection circuitry (e.g., as discussed above following the description of FIGS. 6A-8) determines plug connector 1102 is mated with a corresponding connector and routed using routing or switching circuitry (e.g., as discussed above with reference to FIGS. 6A-8). The connection detection circuitry may prevent live contacts from being exposed and potentially causing contact shorting that harms users, devices and/or other connectors. The routing circuitry may also be included to determine how signals should be transferred between the interconnected cable, devices, accessories, other connectors and other stackable connectors.

Although connector body 1200 is shown and described as including two connectors (i.e., plug connector 1204 and receptacle connector 1202), embodiments of the invention may also include other types of connectors on body 1200. For example, plug connector 1204 could be replaced with a receptacle connector or a connector with a flush mating surface indeterminable as a plug or receptacle connector based on physical appearance. Additionally, instead of using magnets to retain mating contact between plug connector 1204 and receptacle connector 1202, an interference fit may be used to retain the stackable connectors in a mated position.

As mentioned above, more details are provided herein regarding receptacle connector 1006 (shown in FIG. 10A) of device 1000 (shown in FIG. 10A); the following figures illustrate examples of receptacle connector 1106.

Figure 13A:
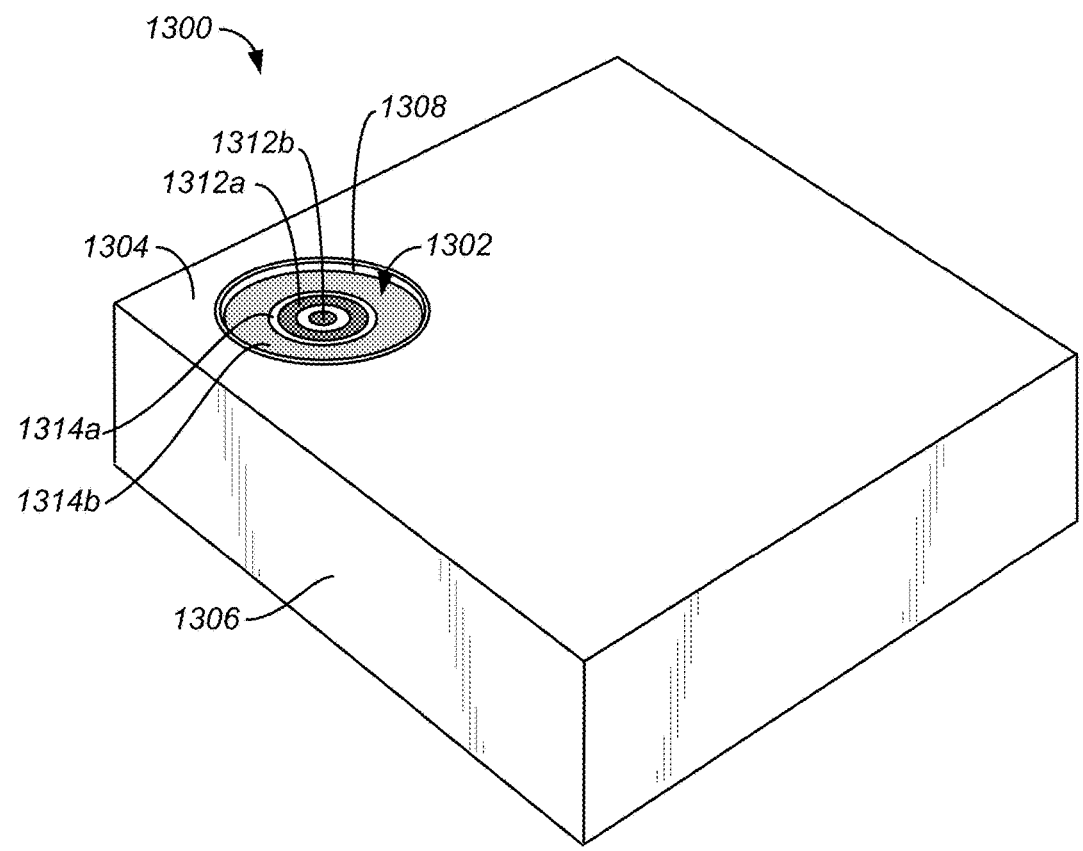
FIG. 13A is a simplified perspective view of a device including a stackable receptacle connector 1302 that can be mated with a corresponding connector, according to an embodiment of the present invention.

FIG. 13A is a simplified perspective view of a device 1300 (e.g., device 1000, shown in FIGS. 10A and 10B) including a stackable receptacle connector 1302 that can be mated with a corresponding connector (e.g., plug connector 1204, as shown in FIG. 12A or plug connector 1102, as shown in FIG. 11B), according to an embodiment of the present invention. Device 1300 may be the same as or similar to device 300 (shown in FIGS. 3A and 3B) and variations thereof. Accordingly, the description above concerning and related to device 300 and variations thereof may apply to device 1300 and is not repeated here in the interest of brevity. Stackable receptacle connector 1302 may be similar to receptacle connector 1202 (shown in FIG. 12B) except that it is located on a back surface 1304 of a device housing 1306 whereas receptacle connector 1202 is located on the back surface of a body 1200 (shown in FIG. 12B). Device 1300 may also include a number of wires coupled to receptacle connector 1302 to provide and receive signals (e.g., data and/or power).

Figure 13B:
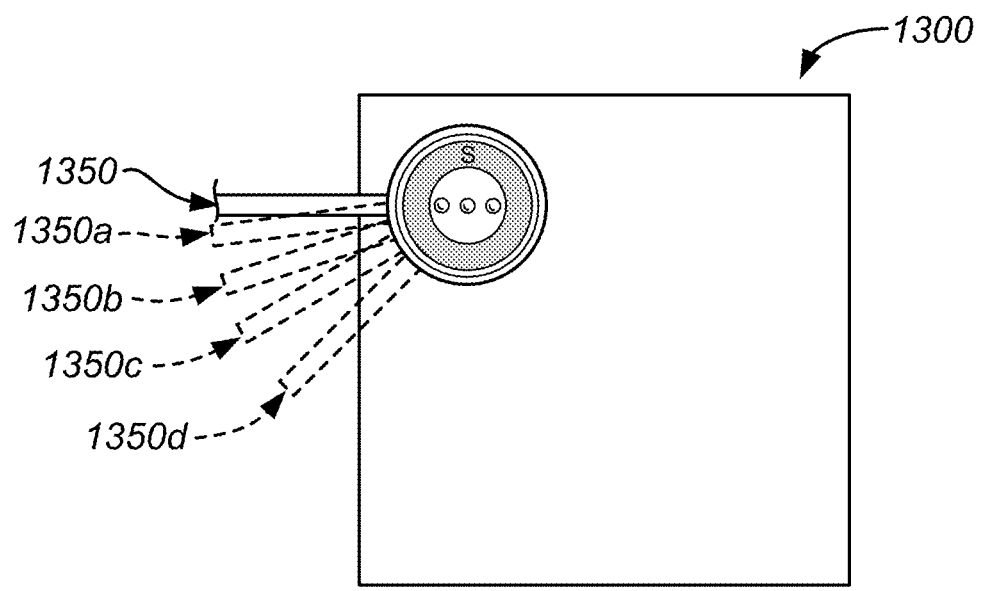
FIGS. 13B and 13C show a back view of a device and partially transparent body including a corresponding plug connector mated with a receptacle connector of the device in a number of different orientations, according to embodiments of the present invention.

As shown in FIG. 13A, back surface 1304 includes a rim 1308 defining a receptacle of a receptacle connector 1302, which is sized and shaped to receive a protruding plug connector (e.g., plug connector 1204, as shown in FIG. 12A). Receptacle connector 1302 includes circular and ring contacts 1312a, 1312b for transmitting signals (e.g., power and/or data) to corresponding, mated connectors. Circular contact 1312a may connect with a single contact (e.g., contacts 1114b, shown in FIG. 11B), while different portions of ring 1316b may connect with multiple contacts (e.g., contacts 1114a, 1114c). As shown in FIG. 13B, contact rings 1312a, 1312b are oriented in a plane and receptacle connector 1302 may be mated with a corresponding connector (e.g., plug connector 1102, as shown in FIG. 11B) about an insertion axis (e.g., insertion axis 1026) that is perpendicular to the plane in which contacts 1312a, 1312b are oriented. As further discussed above, signals may be provided at contacts 1312a, 1312b when connection detection circuitry (e.g., as discussed with reference to FIGS. 6A-8) determines a plug connector is mated with corresponding receptacle connector 1302 and according to routing provided by routing or switching circuitry.

Magnets 1314a, 1314b may have poles arranged to generate a magnetic field to orient, align and/or mate a corresponding plug connector with receptacle connector 1302. For example, the polarity of magnets 1314a and 1314b may be opposite to that of corresponding magnets 1116a, 1116b of plug connector 1102. To provide this polarity, magnets 1314a, 1314b may be permanent magnets, horseshoe magnets, ferromagnetic materials capable of magnetic attraction, rare-earth magnets, materials capable of substantially maintaining receptacle connector 402 and a corresponding plug connector in a mated position using magnetic forces or any combination thereof. Magnets 1314a, 1314b may not only help to mate connectors but also retain connectors in a mated position.

As further discussed above, signals may be provided at contacts 1312a, 1312b when connection detection circuitry (e.g., as discussed above following the description of FIG. 8) determines plug connector 1302 is mated with a corresponding connector and routed using or switching circuitry (e.g., as discussed above with reference to FIGS. 6A-8). The connection detection circuitry may prevent live contacts from being exposed and potentially causing contact shorting that harms users, devices and/or connectors. The routing circuitry may also be included to determine how signals should be transferred between the interconnected cable, devices, accessories, other connectors and other stackable connectors.

Although connector body 1300 is shown and described as including only one connector (i.e., receptacle connector 1302), embodiments of the invention may also include other types of connectors on body 1300. For example, receptacle connector 1302 could be replaced with a plug connector. Additionally, instead of using magnets to retain mating contact between receptacle connector 1302 and a corresponding plug connector, an interference fit may be used to retain the stackable connectors in a mated position.

Receptacle connector 1302 may also be included on a docking station or an adapter, instead or in addition to a device (e.g., device 1300). For example, a docking station may include a receptacle 1302 as well as a plug connector (e.g., plug connector 1204, as shown in FIG. 12A). A device, e.g., device 1000, may be connected with the plug connector of the docking station and the receptacle connector (e.g., receptacle connector 1302) may be used to mate with other stackable connectors. The docking station may provide additional features to a device (e.g., device 1000) or simply allow for hands-free viewing of a display of a device. Receptacle connector 1302 may also be included with other docking stations and may provide backwards compatibility for a device that does not include a stackable receptacle connector.

For example, a docking station may include a stackable receptacle connector (e.g., receptacle connector 1302) that is incompatible with a plug connector included on the docking station, but the plug connector may be compatible with a receptacle connector of a device. The device may be mated with the plug connector of the docking station and other stackable connectors may be mated with the receptacle connector of the docking station. Conversion circuitry may be included in the docking station to convert signals received at the stackable receptacle connector to a format that can be transmitted by the plug connector of the docking station and to convert signals received from the plug connector to a format that can be transmitted by the stackable receptacle connector of the docking station. Similarly, an adapter may include a stackable receptacle connector that is incompatible with its plug connector, but the plug connector may be compatible with the device. Further examples and discussion of conversion circuitry can be found in commonly owned U.S. Pat. No. 8,478,913, filed Nov. 16, 2012, and titled Adapter for Electronic Devices, which is incorporated by reference herein in its entirety for all purposes.

Stackable receptacle connector 1302 may mate with corresponding plug connectors according to the orientations shown in FIG. 3B. However, receptacle connector 1302 of device 1300, and other stackable receptacle connectors discussed herein, may also mate with corresponding plug connectors that are oriented in multiple orientations with respect to receptacle connector 1302, as shown in illustrative examples in the following figures.

Figure 13C:
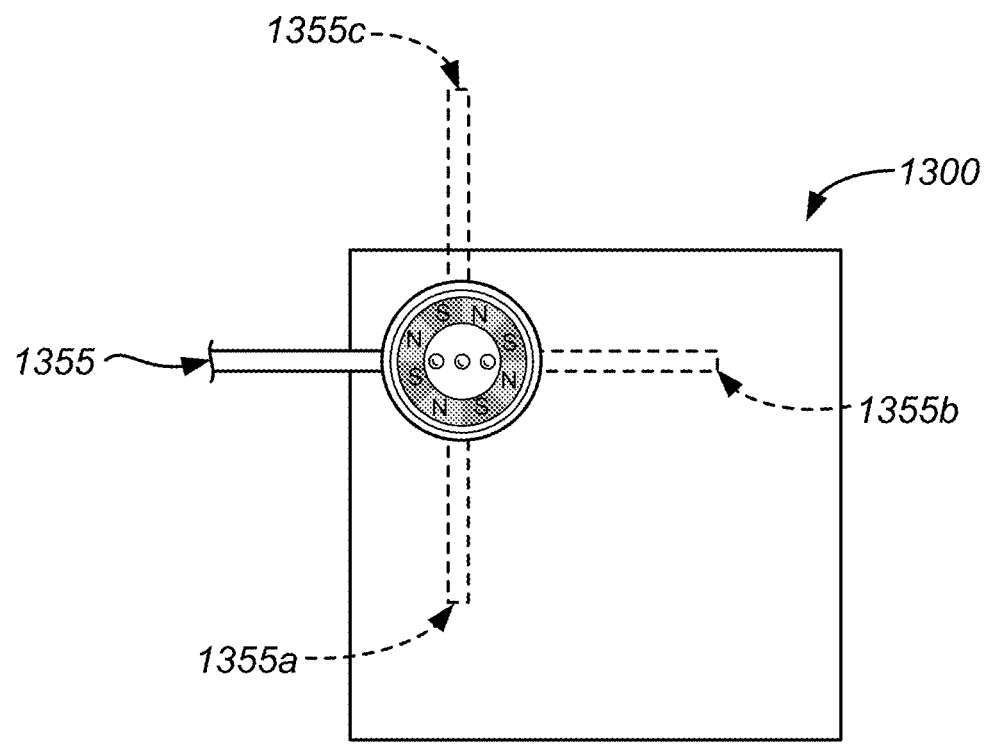

FIGS. 13B and 13C show a back view of device 1300 and partially transparent body including a corresponding plug connector (e.g., plug connector 1102, as shown in FIG. 11B or plug connector 1204, as shown in FIG. 12A) mated with receptacle connector 1302 of device 1300 in a number of different orientations, according to embodiments of the present invention. As shown in FIGS. 13B and 13C, plug connectors 1350 and 1355 may be mated with receptacle connector 1302 (shown in FIG. 13A) of device 1300 in a specific orientation. Plug connectors 1350 and 1355 may be the same as or similar to plug connectors 1102 and 1204 (shown in FIGS. 11B and 12A) and variations thereof, except that the magnetic ring element of plug connectors 1350, 1355 has a specific polarity. Accordingly, the descriptions above concerning and related to plug connector 1102 and 1204 and variations thereof may apply to plug connectors 1350 and 1355 and are not repeated here in their entirety in the interest of brevity.

As shown in FIG. 13B, the body of stackable connector 1350 is partially transparent, allowing a back view of plug connector 1350 to be seen in FIG. 13B and showing the singular polarity of a magnetic ring element of plug connector 1350. The singular polarity of plug connector 1350 allows a magnetic field to be generated and maintained between plug connector 1350 and receptacle connector 1302 even if plug connector 1350 is rotated about its insertion axis to an infinite number of orientations as long as an embodiment of receptacle connector 1302 includes a singular polarity that is opposite the polarity of plug connector 1350. For example, if the polarity of plug connector 1350 and receptacle connector 1302 are singular and opposite, plug connector 1350 may be rotated to the orientations represented by plug connectors 1350a-1350d and still be magnetically attracted to corresponding receptacle connector 1302 and oriented, aligned and/or mated therewith. Connection detection circuitry, as discussed further above, may sense the orientation of plug connector 1350 with respect to receptacle connector 1302 (shown in FIG. 13A) and adjust the routing of signals to the mated contacts of these connectors accordingly, if necessary.

As shown in FIG. 13C, the body of a stackable connector 1355 is partially transparent, allowing a back view of plug connector 1355 to be seen in FIG. 13C, while showing the arrangement of poles of a magnetic ring element of plug connector 1355. As shown in FIG. 13C, plug connector 1350 includes eight equally sized magnetic elements with alternating polarities. In embodiments where receptacle connector 1302 also includes eight equally sized magnetic elements with alternating polarities, a magnetic field may be generated between plug connector 1355 and receptacle connector 1302 even if plug connector 1350 is rotated about its insertion axis to four different orientations, e.g., the additional orientations represented by plug connectors 1355a-1350c drawn with dashed lines. Again, connection detection circuitry, as discussed further above, may sense the orientation of plug connector 1355 with respect to receptacle connector 1302 (shown in FIG. 13A) and adjust the routing of signals to the mated contacts of these connectors accordingly, if necessary.

As mentioned above, a rotary encoder used in combination with sensors such as Hall Effect sensors and resistance sensors may be included in stackable connector bodies to provide inputs to devices or accessories based on changes in detected magnetic fields or electrical characteristics. For example, the rotary encoder may be configured such that moving plug connector 1350 from plug connector orientation 1350a to plug connector orientation 1350d provides an input to electronic device 1300 including instructions to increase the volume of the device's speakers. Alternatively, the rotary encoder may be configured such that moving plug connector 1355 from plug connector orientation 1355a to plug connector orientation 1350c provides an input to electronic device 1300 including instructions to skip the next three songs queued to play on the device. The rotary encoder may be configured in a number of other ways to provide input to device 1300 based on the orientation or change in orientation of a connected stackable connector Although device 1300 is shown and described as having magnets with specific sizes, locations and arrangements, device 1300 may include magnets having a multiplicity of different sizes, location and arrangements. For example, more magnets could be included and magnets could be circular shaped and/or positioned on side surfaces around the perimeter of receptacle connector 1302. Similarly, the magnets of plug connector 1350 and other plug connectors described herein may also be varied in a manner different from the variations listed above with reference to various stackable connector examples contained herein.

As mentioned above, the bodies and other elements associated with stackable connectors may be varied in a number of different ways and may be used to mate numerous combinations of device(s) and/or peripheral(s); the following figures illustrate examples of these variations and combinations.

Figure 14A:
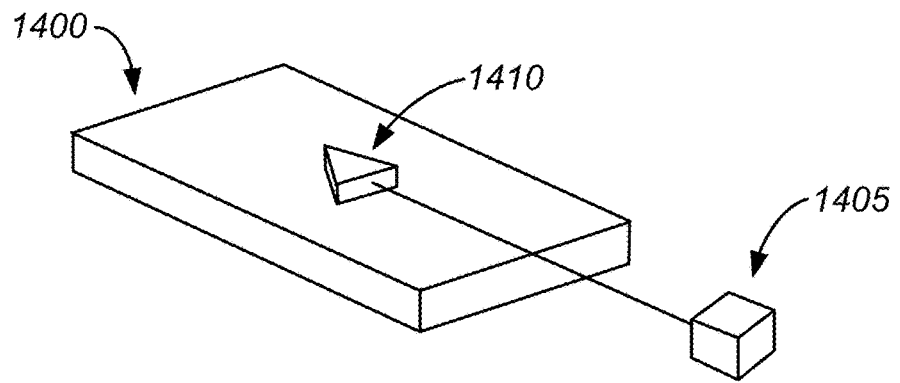
FIGS. 14A-14D illustrate various combinations of device and/or peripheral(s) mated using stackable connectors of various sizes, according to embodiments of the present invention.

FIGS. 14A-14D illustrate various combinations of device and/or peripheral(s) mated using stackable connectors of various sizes, according to embodiments of the present invention. As shown in FIG. 14A, a device 1400 and a peripheral 1405 are mated using stackable connectors, including stackable connector 1410 and a stackable connector (not visible) of device 1400. These stackable connectors may incorporate any of the elements of previously described stackable connectors (e.g., contacts, plug/receptacle type interface and magnets) while being shaped as shown in FIG. 14A. Device 1400 may be any of the devices listed herein and peripheral 1405 may be an external speaker, a health monitor, a car power adapter or any other peripheral listed herein. For example, peripheral 1405 may be an external speaker and device 1400 may be a smartphone. In this example, data (e.g., data related to playing music at speakers) may be routed from device 1400 to peripheral 1405 via stackable connector 1410 and the stackable connector of device 1400 when these stackable connectors are mated. Although a cable is shown connecting peripheral 1405 and stackable connector 1410, the stackable connector may also be disposed directly on peripheral.

Figure 14B:
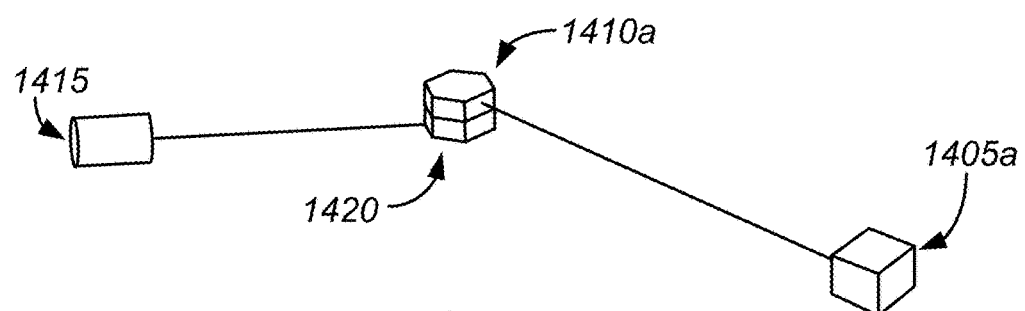

FIG. 14B illustrates a connection formed between two peripherals—peripherals 1405a and 1415—using stackable connectors 1410a and 1420. These stackable connectors may also incorporate any of the elements of previously described stackable connectors (e.g., contacts, plug/receptacle type interface and magnets) while being shaped as shown in FIG. 14B. Peripherals 1405a and 1415 may be any of the peripherals listed herein. For example, peripheral 1405a may be an external speaker (e.g., a variation of peripheral 1405) and peripheral 1415 may be a power adapter. In this example, data (e.g., data related to playing music at speakers) may be wirelessly received by peripheral 1405a from a device (e.g., device 1400), while power may be received by peripheral 1405a via stackable connectors 1410a and 1420 when they are mated as shown in FIG. 14B. As with peripheral 1405, stackable connectors 1410a and 1420 may be disposed directly on peripherals 1405a and 1415, respectively.

Figure 14C:
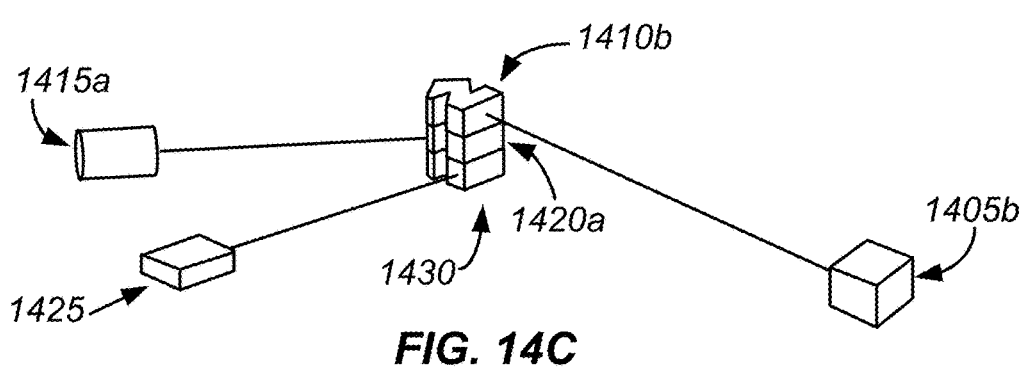

FIG. 14C illustrates a connection formed between three peripherals—peripherals 1405b, 1415a and 1425—using stackable connectors 1410b, 1420a and 1430. These stackable connectors may also incorporate any of the elements of previously described stackable connectors (e.g., contacts, plug/receptacle type interface and magnets) while being shaped as shown in FIG. 14C. Peripherals 1405b, 1415a and 1425 may be any of the peripherals listed herein. For example, peripheral 1405b may be an external speaker (e.g., a variation of peripheral 1405), peripheral 1415a may be a power adapter (e.g., a variation of peripheral 1415) and peripheral 1425 may be a health monitor. In this example, data (e.g., data obtained by peripheral 1425) may be routed from stackable connector 1430 to stackable connector 1410b via stackable connector 1420a, while power may be received by peripheral 1405b and 1425 via the connection established between stackable connectors 1410b, 1420a and 1430 when mated as shown in FIG. 14C. As with peripherals 1405a and 1415, stackable connectors 1410b, 1420a and 1430 may be disposed directly on peripherals 1405b, 1415a and 1425, respectively.

Figure 14D:
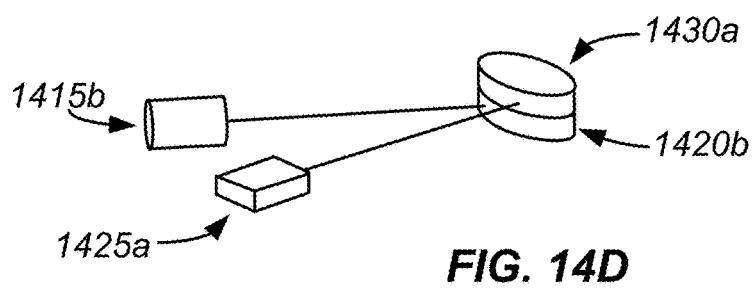

FIG. 14D illustrates a connection formed between two peripherals—peripherals 1415b and 1425a—using stackable connectors 1420b and 1430a. These stackable connectors may also incorporate any of the elements of previously described stackable connectors (e.g., contacts, plug/receptacle type interface and magnets) while being shaped as shown in FIG. 14D. Peripherals 1415b and 1425a may be any of the peripherals listed herein. For example, peripheral 1415b may be a power adapter (e.g., a variation of peripheral 1415a) and peripheral 1425a may be a health monitor (e.g., a variation of peripheral 1425). In this example, data (e.g., commands related to charging and/or charge state data) may be routed from stackable connector 1430a to stackable connector 1420b, while power may be received by peripheral 1425a via the connection established between stackable connectors 1420b and 1430a when mated as shown in FIG. 14C and when peripheral 1425a sends a request change command to the peripheral 1415b via stackable connector 1420b. As with peripherals 1405b, 1415a and 1425, stackable connectors 1420b and 1430a may be disposed directly on peripherals 1415b and 1425a, respectively.

Also, while a number of specific embodiments were disclosed with specific features, a person of skill in the art will recognize instances where the features of a number of different embodiments can be combined with the features of another embodiment. In addition, some specific embodiments of the invention set forth above were illustrated with connectors including two or three contacts. A person of skill in the art will readily appreciate that stackable connectors may include a number of different types and numbers of contacts that communicate a number of different types of signals. Also, those skilled in the art will recognize, or be able to ascertain using no more than routine experimentation, many equivalents to the specific embodiments of the inventions described herein. Such equivalents are intended to be encompassed by the following claims.

What is claimed is:

1. A connector for wirelessly transferring data to an electronic device, the connector comprising:
   a connector body, comprising:
      a first magnet configured to align and magnetically couple a contact surface of the connector body with the electronic device in any one of multiple orientations by interacting with a second magnet of the electronic device, and
      a transmission coil configured to wirelessly send data to a receiving system of the electronic device, the transmission coil being positioned relative the first magnet so that the interaction between the first and second magnets aligns the transmission coil with the receiving system when the connector body is magnetically coupled with the electronic device; and
   circuitry configured to distinguish between at least a first orientation and a second orientation of the connector body with respect to the electronic device and to route a first signal between the connector body and the electronic device when the connector body is in the first orientation and route a second signal different from the first signal between the connector body and the electronic device when the connector body is in the second orientation.

2. The connector of claim 1, wherein the first magnet is a ring magnet.

3. The connector of claim 2, wherein the transmission coil is aligned with receiving coils of the receiving system when the connector body is magnetically coupled with the electronic device.

4. The connector of claim 3, wherein the transmission coil is configured to transfer power inductively to the receiving coils.

5. The connector of claim 2, wherein the transmission coil further comprises a coil-based repeater electrical system for routing signals to the receiving system.

6. The connector of claim 1, wherein the connector body is a cylindrical connector body, a contact surface of the cylindrical connector body facilitating alignment of the cylindrical connector body with the electronic device in multiple orientations.

7. The connector of claim 1, wherein the connector body is configured to wirelessly send both power and data to the receiving system of the electronic device.

8. The connector of claim 1, wherein the electronic device is a first device and the connector body is a first connector body that includes a third magnet having poles arranged to align and magnetically couple the first connector body with a second connector body associated with a second device by interacting with a fourth magnet disposed within the second connector body.

9. The connector of claim 8, wherein the first connector body includes another receiving system configured to receive signals wirelessly from a third device electrically coupled to the second connector body.

10. A method for wirelessly transferring data, the method comprising:
    magnetically coupling a connector body with an electronic device, wherein interaction between a first magnet disposed within the connector body and a second magnet within the electronic device positions the connector body at a location on the electronic device in any one of multiple orientations in which a transmission coil within the connector body is aligned with a receiving coil within the electronic device; and
    wirelessly transferring a first data signal between the connector body and the receiving coil when the connector body is in a first orientation with respect to the electronic device and transferring a second data signal, different from the first data signal, when the connector body is in a second orientation with respect to the electronic device using the transmission coil.

11. The method of claim 10, further comprising wirelessly receiving data from the electronic device using an optical receiver.

12. The method of claim 11, wherein magnetically coupling the connector body with the electronic device comprises placing a first surface of the connector body in direct contact with an exterior surface of the electronic device.

13. The method of claim 12, wherein the connector body is a first connector body and wherein the method further comprises magnetically coupling a second connector body with a second surface of the first connector body, the second surface being opposite the first surface.

14. A peripheral device, comprising:
    a connector body enclosing a first magnetic element and a wireless transmission coil, the first magnetic element being configured to interact with a second magnetic element disposed within an electronic device to magnetically couple the connector body to the electronic device in any one of multiple orientations in which the wireless transmission coil is aligned with a receiver coil of the electronic device; and
    circuitry configured to distinguish between at least a first orientation and a second orientation of the connector body with respect to the electronic device and to route a first signal between the connector body and the electronic device when the connector body is in the first orientation and route a second signal different from the first signal between the connector body and the electronic device when the connector body is in the second orientation.

15. The peripheral device of claim 14, further comprising an optical transceiver configured to both send data to and receive data from the electronic device when the wireless transmission coil is aligned with the receiver coil of the electronic device.

16. The peripheral device of claim 14, further comprising:
    a communication chip electrically coupled to the wireless transmission coil,
    wherein the communication chip is in communication with the electronic device via the wireless transmission coil of the connector body.

17. The peripheral device of claim 14, wherein the peripheral device is operable as a power adapter charger.

18. The peripheral device of claim 17, wherein the connector body is configured to wirelessly transmit power from the transmission coil to the receiver coil by inductive wireless charging.

* * * * *